US010810880B1

(12) United States Patent
Schweitzer et al.

(10) Patent No.: US 10,810,880 B1
(45) Date of Patent: Oct. 20, 2020

(54) SYSTEMS AND METHODS FOR AVOIDING INTERSECTION COLLISIONS

(71) Applicant: Verizon Patent and Licensing Inc., Arlington, VA (US)

(72) Inventors: David Harlan Schweitzer, Alpharetta, GA (US); John Gregory Bosque, Roswell, GA (US); Dante J. Pacella, Charles Town, WV (US); Lee E. Sattler, Mt. Airy, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/683,084

(22) Filed: Nov. 13, 2019

(51) Int. Cl.
*G01S 13/931* (2020.01)
*G08G 1/16* (2006.01)
*G08G 1/01* (2006.01)

(52) U.S. Cl.
CPC .......... *G08G 1/166* (2013.01); *G08G 1/0145* (2013.01); *G08G 1/164* (2013.01)

(58) Field of Classification Search
CPC .................................................... G08G 1/161
See application file for complete search history.

(56) References Cited

U.S. PATENT DOCUMENTS

| | | | | |
|---|---|---|---|---|
| 2016/0073298 | A1* | 3/2016 | Brahmi | H04W 72/0453 455/436 |
| 2019/0053154 | A1* | 2/2019 | Song | H04W 4/40 |
| 2019/0088041 | A1* | 3/2019 | Lee | H04W 4/12 |
| 2019/0206236 | A1* | 7/2019 | Tao | G05D 1/0088 |
| 2019/0385458 | A1* | 12/2019 | Garrett | G08G 1/166 |

* cited by examiner

*Primary Examiner* — Joseph H Feild
*Assistant Examiner* — Pameshanand Mahase

(57) ABSTRACT

A first device may receive, from a second device associated with an emergency motor vehicle (EMV), EMV-tracking information and a communication that the EMV is in emergency response mode and may determine, based on the EMV-tracking information, that the EMV is approaching an intersection. The first device may receive, from a third device associated with a user vehicle, user-tracking information. The first device may determine, based on the user-tracking information, that the user vehicle is approaching the intersection. The first device may determine, based on the EMV-tracking information and the user-tracking information, whether the EMV is predicted to collide with the user vehicle. The first device may provide, to the second device and based on the determination of whether the EMV is predicted to collide with the user vehicle, a first notification including information regarding safety of the EMV proceeding through the intersection.

20 Claims, 9 Drawing Sheets

SYSTEMS AND METHODS FOR AVOIDING INTERSECTION COLLISIONS

BACKGROUND

An emergency motor vehicle (EMV) may include light systems to provide visual warnings to other vehicles and a siren to provide audible warnings to other vehicles. When an EMV has activated the light systems and the siren, other vehicles are legally obligated to yield right-of-way to the EMV.

DETAILED DESCRIPTION OF PREFERRED EMBODIMENTS

Figure 1A:
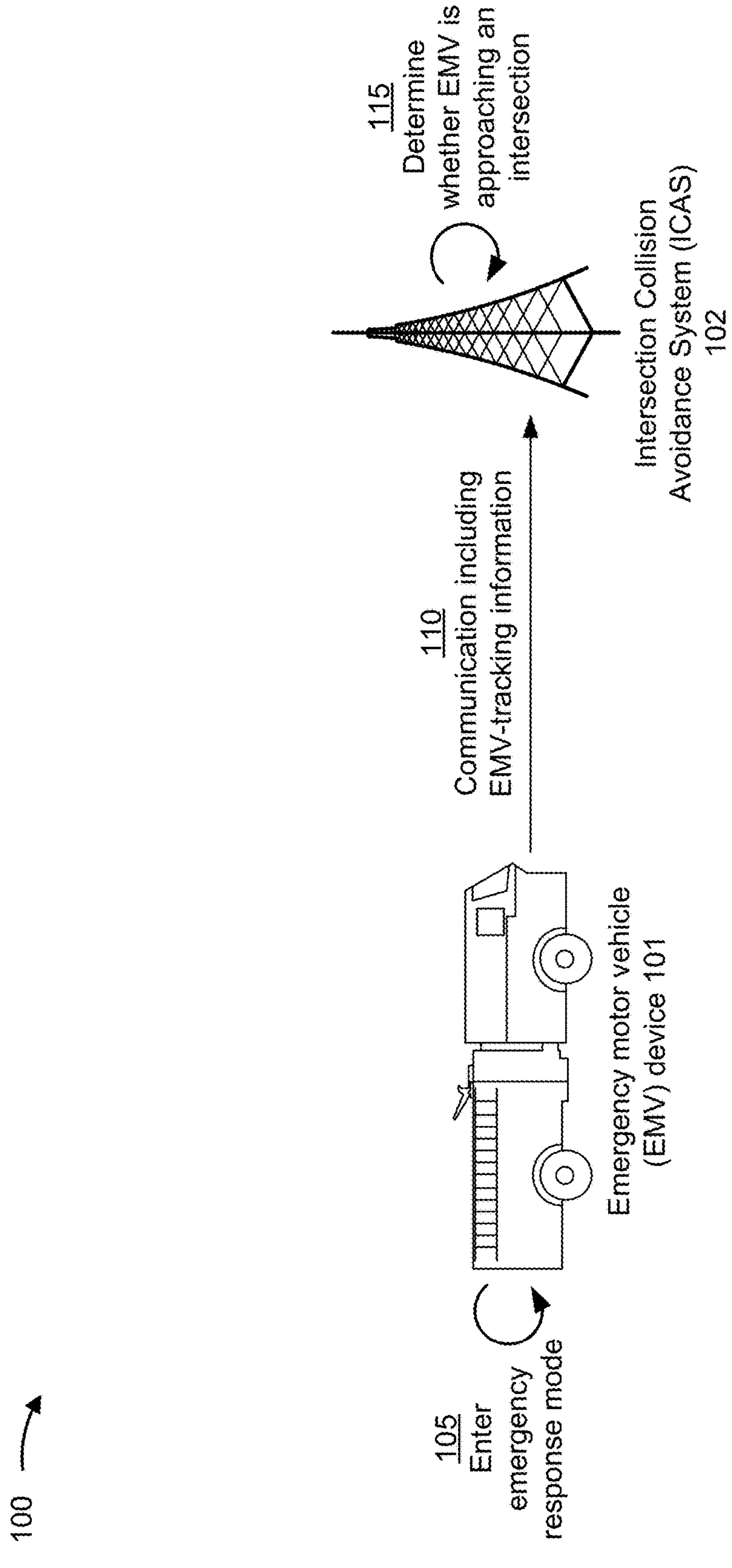
FIGS. 1A-1F are diagrams of one or more example implementations described herein.

The following detailed description of example implementations refers to the accompanying drawings. The same reference numbers in different drawings may identify the same or similar elements.

Traffic control systems may prevent collisions (e.g., between vehicles, between vehicles and pedestrians, and/or the like) by using stages to coordinate traffic flow, where directions of movement permitted in a stage prevent collisions regardless of vehicle and/or pedestrian speed. Some traffic control systems include traffic signal preemption (TSP) systems, which allow an EMV to remotely communicate that the EMV is approaching an intersection so that the traffic control system provides signals to stop vehicles and grant right-of-way to the EMV and/or traffic moving in the same direction as the EMV.

However, TSP systems do not account for real-time traffic behavior and merely respond to the communication from the EMV by changing signals. When TSP systems change signals, drivers of vehicles may fail to notice the abnormal change to the signal and proceed through the intersection increasing the likelihood of a collision. Collisions may result in damage to vehicles, repairs to vehicles and/or roadside equipment (e.g., telephone poles, signage, buildings, and/or the like), the use of tow trucks, and/or the like which consumes vehicle resources, equipment resources, financial resources, computing resources, network resources (e.g., researching repair providers, researching a repair, scheduling a repair, and/or the like) and/or the like.

Additionally, or alternatively, TSP systems may be vulnerable to exploitation by bad actors that may use TSP systems to disrupt traffic flow and/or execute terrorist attacks. Disrupted traffic flow and terrorist attacks consume vehicle resources (e.g., fuel consumed while in traffic, fuel consumed by EMVs responding to terrorist attacks, and/or the like), equipment resources, financial resources, and/or the like by slowing traffic, damaging property (e.g., buildings, vehicles, infrastructure, computer systems, and/or the like), disrupting economic activity, and/or the like.

Some implementations described herein provide an intersection collision avoidance system (ICAS) that may receive tracking information from an EMV approaching an intersection, receive tracking information from vehicles approaching the intersection, and provide, to the EMV and/or vehicles, information regarding safety of the EMV and/or vehicles proceeding through the intersection. In some implementations, the ICAS may receive from the EMV (e.g., a device associated with the EMV), EMV-tracking information and a communication that the EMV is in emergency response mode. In some implementations, the EMV-tracking information includes attributes of the EMV including a location of the EMV, a direction of travel of the EMV, activated turn signals indicative of an intended change in the direction of travel of the EMV, and/or a speed of the EMV. In some implementations, the ICAS may determine, based on the EMV-tracking information, that the EMV is approaching an intersection. Additionally, or alternatively, the ICAS may determine, based on the EMV-tracking information, that the EMV is approaching a drivable location (e.g., a left turn, a right turn, a roundabout, an intersection of two roads that cross each other, an intersection of more than two roads, an intersection at which a first road does not pass through a second road and vehicles on the first road must turn right or left onto the second road, such as a "T" intersection and/or a "Y" intersection, and/or the like), one or more lanes merging with one or more other lanes, for example, an on-ramp, an off-ramp, and/or the like.

In some implementations, the ICAS may receive, from a user vehicle (e.g., a second device associated with a user vehicle), user-tracking information, where the user-tracking information indicates user vehicle attributes including any combination of a location of a user vehicle, a direction of travel of the user vehicle, and/or a speed of the user vehicle. In some implementations, the ICAS may determine, based on the user-tracking information, that the user vehicle is approaching the intersection.

In some implementations, the ICAS may determine, based on the EMV-tracking information and the user-tracking information, whether the EMV is predicted to collide with the user vehicle. In some implementations, the ICAS may provide, to the first device and based on the determination of whether the EMV is predicted to collide with the user vehicle, a notification including information regarding safety of the EMV proceeding through the intersection.

In this way, the ICAS may provide the EMV with real-time traffic information regarding the safety of the EMV proceeding through the intersection to reduce the likelihood of a collision (e.g., due to a driver failing to yield right-of-way, failing to notice a change to a traffic signal, and/or the like). By reducing the likelihood of a collision when the EMV approaches the intersection, the ICAS conserves the vehicle resources, equipment resources, financial resources, computing resources, network resources, and/or the like that would otherwise be consumed by damage to vehicles, repairs to vehicles and/or roadside equipment, the use of tow trucks, and/or the like.

In some implementations, the ICAS may use a smart contract, based on an identifier from the first device and a hash, that identifies the first device and that the first device is associated with the EMV and may store data including the EMV-tracking information and the notification provided to the first device. In this way, the ICAS may conserve vehicle resources, equipment resources, financial resources, and/or the like that would otherwise be consumed by bad actors exploiting TSP systems to disrupt traffic flow and/or execute terrorist attacks.

FIGS. 1A-1F are diagrams of one or more example implementations described herein. For example, as shown in FIGS. 1A-1F, example implementation(s) 100 may include an EMV device 101, an ICAS 102, a user device 103, a traffic control signal 106, a traffic control signal 107, a public dispatch system 108, a first EMV device 111, and a second EMV device 112.

As shown in FIG. 1A, and by reference number 105, the EMV device 101 may enter an emergency response mode. For example, the EMV device 101 may enter the emergency response mode by activating light systems to provide visual warnings to other vehicles and/or a siren to provide audible warnings to other vehicles. In some implementations, the EMV device 101 may enter the emergency response mode based on receiving instructions (e.g., from the public dispatch system 108 and/or the like) to respond to an emergency (e.g., a fire emergency, a medical emergency, a vehicle collision, a downed powerline, a public safety emergency, and/or the like).

In some implementations, the EMV device 101 may be associated with an EMV (e.g., a fire engine, a ladder truck, an emergency medical transport vehicle, a law-enforcement vehicle, and/or the like). For example, the EMV device 101 may be an in-vehicle mobile data terminal (e.g., a mobile data terminal connected to an in-vehicle system, a mobile data terminal installed in the EMV, and/or the like), a mobile device of an operator in the EMV, an auxiliary device mounted in the EMV, a head-mounted display device, a heads-up display, an in-vehicle warning system, and/or the like.

Additionally, or alternatively, the EMV device 101 may be in communication with the in-vehicle system of the EMV such that, when the EMV enters the emergency response mode, the in-vehicle system notifies the EMV device 101 that the EMV has entered the emergency response mode. For example, if the EMV device 101 is a computer and/or user device associated with a driver and/or passenger in the EMV, the EMV device 101 may be connected (e.g., via a wired and/or wireless connection) to the in-vehicle system of the EMV such that, when a driver and/or passenger of the EMV activates the light systems and/or siren, the in-vehicle system notifies the EMV device 101 that the EMV has entered the emergency response mode.

As shown in FIG. 1A, and by reference number 110, the EMV device 101 may provide a communication including EMV-tracking information to the ICAS 102. For example, the EMV device 101 may provide, to the ICAS 102 and based on the EMV entering the emergency response mode, a communication including EMV-tracking information. In some implementations, the EMV device 101 may provide, to the ICAS 102, EMV-tracking information and a communication that the EMV is in the emergency response mode.

In some implementations, the EMV device 101 may provide, to the ICAS 102, EMV-tracking information in real-time. For example, the EMV-tracking information may indicate a location of the EMV (e.g., in Global Positioning System (GPS) coordinates), a direction of travel of the EMV, an intended destination of the EMV, activated turn signals indicative of an intended change in the direction of travel of the EMV, a speed of the EMV, and/or the like. In this way, the ICAS 102 may monitor the location of the EMV, the direction of travel of the EMV, activated turn signals indicative of an intended change in the direction of travel of the EMV, the speed of the EMV, and/or the like.

In some implementations, the ICAS 102 may monitor the location of the EMV, the direction of travel of the EMV, the speed of the EMV, and/or the like using network data (e.g., cellular, Wi-Fi, and/or the like network data), GPS, beacon technology, and/or the like. For example, the ICAS 102 may, based on the communication that the EMV is in the emergency response mode, monitor a location and movements of the EMV device 101 based on data identifying networks around the EMV device 101, beacons (e.g., Bluetooth beacons and/or the like) near the EMV device 101, and/or the like. In this way, the ICAS 102 may confirm and/or supplement the EMV-tracking information.

In some implementations, the EMV device 101 may provide, to the ICAS 102 and based on the EMV exiting the emergency response mode, a communication that the EMV is not in an emergency response mode and may stop providing EMV-tracking information to the ICAS 102. For example, the EMV device 101 may only provide EMV-tracking information and the ICAS 102 may only monitor the EMV-tracking information while the EMV is in an emergency response mode. In this way, the EMV device 101 and the ICAS 102 may conserve computing resources (e.g., processing resources, memory resources, power resources, communication resources, and/or the like) and/or network resources that would otherwise be used by continuously providing and monitoring EMV-tracking information regardless of whether the EMV was in emergency response mode or not.

In some implementations, the EMV device 101 may provide, to the ICAS 102, an identifier, and the ICAS 102 may generate, based on the identifier, a hash. In some implementations, the identifier may uniquely identify the EMV device 101 (e.g., a device identifier, a serial number, data from an embedded Universal Integrated Circuit Card (eUICC), data from a subscriber identification module (SIM) card, and/or the like) and/or the EMV (e.g., a vehicle number, a vehicle identification number (VIN), and/or any other information that uniquely identifies the EMV).

In some implementations, the ICAS 102 may write the hash to a smart contract (e.g., a blockchain-based smart contract and/or the like), where the smart contract identifies the EMV device 101 and that the EMV device 101 is associated with the EMV. In some implementations, the ICAS 102 may store, in the smart contract, data including the EMV-tracking information and notifications provided by the ICAS 102 to the EMV device 101. For example, the EMV device 101 may provide, to the ICAS 102, data from the eUICC of the EMV device 101 as the identifier, the ICAS 102 may write an event history, based on the EMV-tracking information and notifications provided by the ICAS 102 to the EMV device 101, to the smart contract, and public safety agencies may access the event history via a subscription to the smart contract. In this way, the ICAS 102 may conserve vehicle resources, equipment resources, financial resources, and/or the like that would otherwise be consumed by bad actors exploiting TSP systems to disrupt traffic flow and/or execute terrorist attacks.

As shown in FIG. 1A, and by reference number 115, the ICAS 102 may determine whether the EMV is approaching an intersection. For example, the ICAS 102 may determine whether the EMV is approaching an intersection based on the EMV-tracking information and a map of an area in which the EMV is traveling (e.g., a map that identifies roads and locations of traffic lights and/or the like). In some implementations, the ICAS 102 may plot GPS coordinates (e.g., from the EMV-tracking information) on the map and determine whether the EMV is approaching an intersection based on the direction of travel of the EMV (e.g., from the EMV-tracking information). In some implementations, the ICAS 102 may determine whether the EMV is approaching a drivable location (e.g., a left turn, a right turn, a roundabout, an intersection of two roads that cross each other, an intersection of more than two roads, an intersection at which a first road does not pass through a second road and vehicles on the first road must turn right or left onto the second road, such as a "T" intersection and/or a "Y" intersection, and/or the like), one or more lanes merging with one or more other lanes, for example, an on-ramp, an off-ramp, and/or the like. Although FIGS. 1A-1F provide an example involving an intersection of two roads that cross each other, other examples may involve another drivable location. Accordingly, where the example of FIGS. 1A-1F refer to an intersection, the example may also be applied to a drivable location.

In some implementations, the ICAS 102 may determine whether the EMV is approaching an intersection in real-time and/or at intervals (e.g., every second, every two seconds, every five seconds, and/or the like). Additionally, or alternatively, the ICAS 102 may determine whether the EMV is approaching an intersection based on data identifying networks (e.g., Wi-Fi networks, local area networks, and/or the like) around the EMV device 101, data from beacons (e.g., Bluetooth beacons and/or the like) near the EMV device 101, data from beacons located near intersections that detect the EMV device 101, data from sensors located near intersections that detect the EMV and/or the EMV device 101, and/or the like.

In some implementations, the ICAS 102 may, based on determining that the EMV is approaching an intersection, monitor movement of all devices in and approaching the intersection. For example, the ICAS 102, may, based on determining that the EMV is approaching an intersection, monitor wireless network data generated by devices in and approaching the intersection.

Figure 1B:
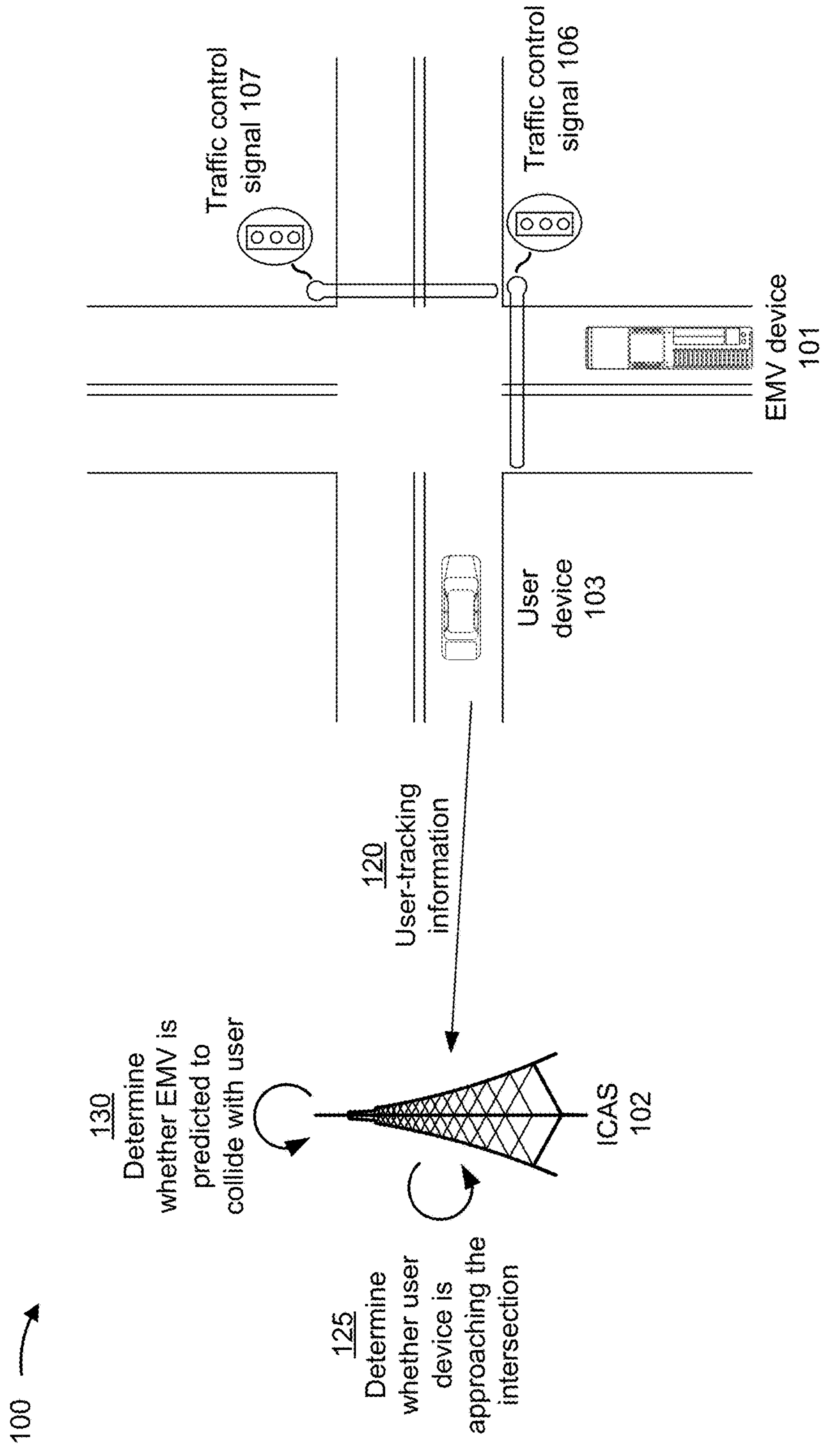

As shown in FIG. 1B, and by reference number 120, a user device 103 may provide, to the ICAS 102, user-tracking information. For example, the user device 103 may provide, to the ICAS 102, user-tracking information, where the user-tracking information indicates a location of the user vehicle (e.g., in Global Positioning System (GPS) coordinates), a direction of travel of the user vehicle, a speed of the user vehicle, and/or the like. In some implementations, the user device 103 may be running an application that provides data to and receives data from the ICAS 102. Additionally, or alternatively, the user device 103 may include firmware that provides data (e.g., wireless network data and/or the like) to and receives data from the ICAS 102.

In some implementations, the user device 103 may be associated with a user vehicle. For example, the user device 103 may be a mobile device of a user in the user vehicle, a network-connected device installed in the user vehicle (e.g., a dongle connected to an on-board diagnostic (OBD) port of the user vehicle and/or the like), an in-vehicle system installed in the user vehicle, a mobile data terminal in the user vehicle (e.g., a mobile data terminal connected to the in-vehicle system, a mobile data terminal installed in the user vehicle, and/or the like), and/or the like. Additionally, or alternatively, the user device 103 may be in communication (e.g., via a wired and/or wireless connection) with the in-vehicle system of the user vehicle such that the user device 103 may receive user-tracking information (e.g., a location of the user vehicle, a direction of travel of the user vehicle, a speed of the user vehicle, and/or the like) from the in-vehicle system.

Additionally, or alternatively, the user device 103 may be associated with a pedestrian, a cyclist, and/or the like. For example, the user device 103 may be a mobile device of the pedestrian, and the user device 103 may provide, to the ICAS 102, user-tracking information, where the user-tracking information indicates a location of the pedestrian (e.g., in Global Positioning System (GPS) coordinates), a direction of travel of the pedestrian, a speed of the pedestrian, and/or the like.

In some implementations, the user device 103 may provide, to the ICAS 102, an identifier, and the ICAS 102 may generate, based on the identifier, a hash. Additionally, or alternatively, the ICAS 102 may write the hash to a smart contract (e.g., a blockchain-based smart contract and/or the like), where the smart contract identifies the user device 103 and that the user device 103 is associated with the user vehicle. In some implementations, the ICAS 102 may store, in the smart contract, data including the user-tracking information and notifications provided by the ICAS 102 to the user device 103. For example, the user device 103 may provide, to the ICAS 102, data from an embedded Universal Integrated Circuit Card (eUICC) of the user device 103 as the identifier, the ICAS 102 may write an event history, based on the user-tracking information and notifications provided by the ICAS 102 to the user device 103, to the smart contract, and public safety agencies may access the event history via a subscription to the smart contract.

In some implementations, the ICAS 102 may receive, from a plurality of vehicles associated with a plurality of users, user-tracking information. In some implementations, the ICAS 102 may determine, based on the user-tracking information, that at least one vehicle is approaching the intersection.

In some implementations, the ICAS 102 may receive user-tracking information from a sensor device located at the intersection. For example, the sensor device may have a field of view to detect vehicles, pedestrians, objects, and/or the like approaching, passing through, and/or exiting the intersection. In some implementations, the sensor device may include a smart camera, a sensor, and/or the like and may provide, to the ICAS 102, tracking information (e.g., user-tracking information) and/or the like for vehicles, pedestrians, objects, and/or the like within the field of view. For example, the sensor device may use machine vision techniques and/or the like to detect, identify, and/or generate tracking information for vehicles, pedestrians, objects, and/or the like within the field of view.

As shown in FIG. 1B, and by reference number 125, the ICAS 102 may determine whether the user device 103 is approaching the intersection. For example, the ICAS 102, based on the user-tracking information, may determine whether the user device 103 is approaching the intersection. In some implementations, the ICAS 102 may determine whether the user device 103 is approaching the intersection based on the user-tracking information and a map of an area in which the user device 103 is traveling. In some implementations, the ICAS 102 may plot GPS coordinates (e.g., from the user-tracking information) on the map and determine whether the user device 103 is approaching an intersection based on the direction of travel of the user device 103 (e.g., from the user-tracking information).

In some implementations, the ICAS 102 may determine whether the user device 103 is approaching the intersection in real-time and/or at intervals (e.g., every second, every two seconds, every five seconds, and/or the like). Additionally, or alternatively, the ICAS 102 may determine whether the user device 103 is approaching the intersection based on data identifying networks (e.g., Wi-Fi networks, local area networks, and/or the like) around the user device 103, data from beacons (e.g., Bluetooth beacons and/or the like) near the user device 103, data from beacons located near intersections that detect the user device 103, data from sensors located near intersections that detect the user vehicle and/or the user device 103, and/or the like.

As shown in FIG. 1B, and by reference number 130, the ICAS 102 may determine whether the EMV is predicted to collide with the user. For example, the ICAS 102, based on determining that the user device 103 is approaching the intersection, may determine whether the EMV is likely to collide with the user vehicle. In some implementations, the ICAS 102 may determine whether the EMV is predicted to collide with the user vehicle in real-time and/or at intervals (e.g., every second, every two seconds, every five seconds, and/or the like). Additionally, or alternatively, the ICAS 102, based on the EMV-tracking information, may determine a route of the EMV through the intersection (e.g., based on activated turn signals indicative of an intended change in the direction of travel of the EMV and/or the like) and may use the route to determine whether the EMV is predicted to collide with the user vehicle.

In some implementations, the ICAS 102 may predict whether the EMV and the user vehicle are likely to collide based on the EMV-tracking information and the user-tracking information. For example, the ICAS 102 may predict that the EMV and the user vehicle are likely to collide based on the user-tracking information indicating that the user vehicle is not yielding right-of-way to the EMV (e.g., the user vehicle is maintaining speed, the user vehicle is accelerating, the user vehicle is not changing a direction of travel, and/or the like).

In some implementations, the ICAS 102 may predict that the EMV and the user vehicle are likely to collide based on determining that both the EMV and the user vehicle are predicted to be in the intersection within a time period (e.g., a five-second time period, a ten-second time period, a twenty-second time period, and/or the like). For example, the ICAS 102 may determine that the user vehicle is predicted to be in the intersection at a first time and that the EMV is predicted to be in the intersection at a second time, where the first time and the second time are within twenty seconds of each other, and predict that the EMV and the user vehicle are likely to collide.

Figure 1C:
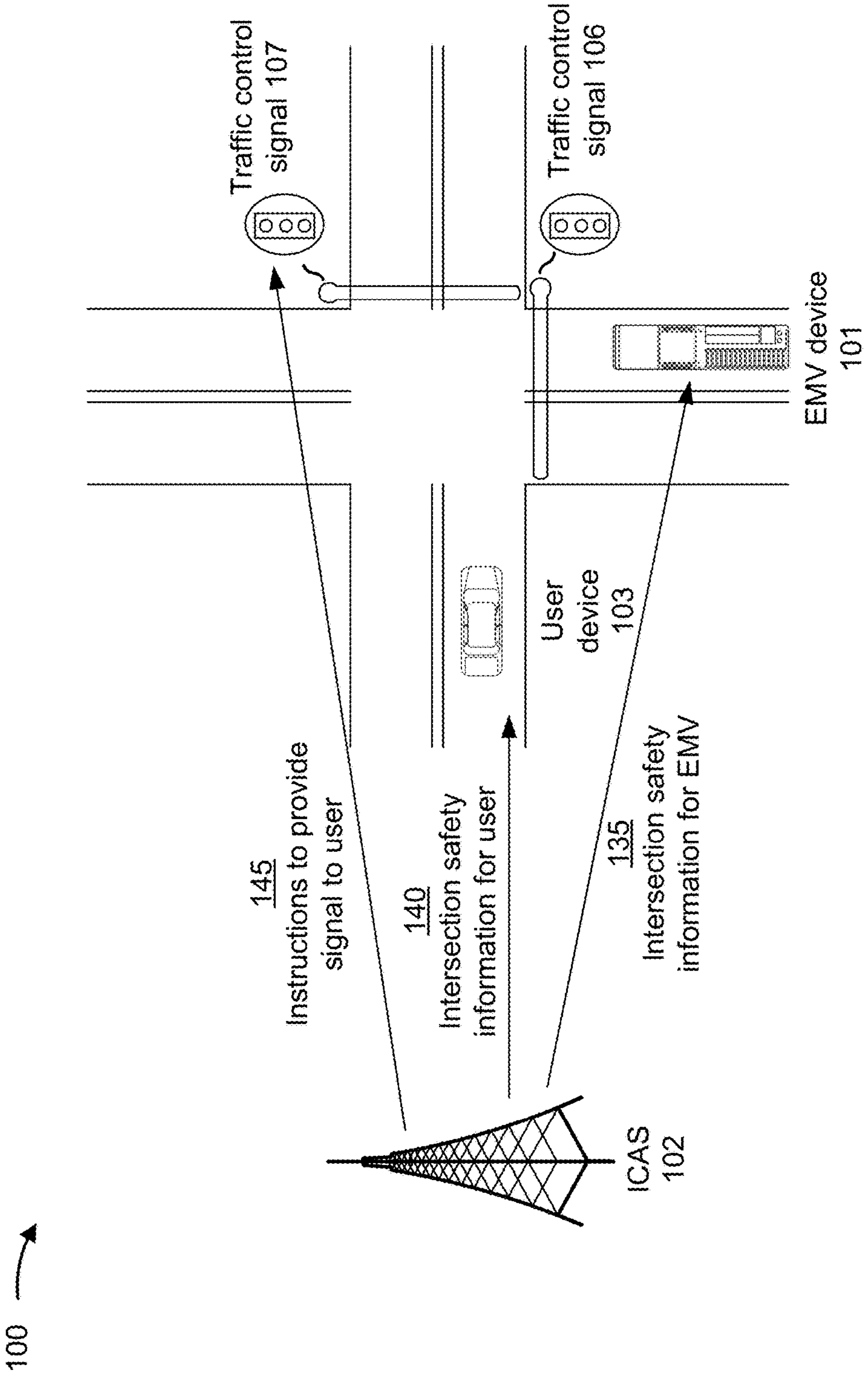

As shown in FIG. 1C, and by reference number 135, the ICAS 102 may provide, to the EMV device 101, intersection safety information for the EMV. For example, the ICAS 102 may provide, to the EMV device 101, a notification including information regarding safety of the EMV proceeding through the intersection based on the determination of whether the EMV is predicted to collide with the user vehicle.

In some implementations, the ICAS 102 may provide, to the EMV device 101, a notification including an audible alert, a visual alert, information regarding the user vehicle (e.g., a type of the user vehicle (e.g., automobile, van, pickup truck, box truck, tractor trailer, and/or the like), a color of the user vehicle, the speed of the user vehicle, and/or the like), information regarding a lane in which the user vehicle is traveling, a directional indicator of the location of the user vehicle with respect to the EMV, and/or a message indicating that the EMV may safely proceed through the intersection. For example, the ICAS 102 may determine, based on the user-tracking information, that the user vehicle is not yielding right-of-way to the EMV, and may provide, to the EMV device 101, a message that the user vehicle is not yielding and that the user vehicle is located to the northwest of the EMV. Additionally, or alternatively, the ICAS 102 may determine, based on the user-tracking information, that the user vehicle is yielding right-of-way to the EMV, and may provide, to the EMV device 101, a message that the user vehicle is yielding and that the EMV may proceed through the intersection safely.

In some implementations, the ICAS 102, after providing the notification to the EMV, may determine that the information regarding safety of the EMV proceeding through the intersection has changed (e.g., the user vehicle has yielded, the user vehicle has accelerated, another vehicle is not yielding, and/or the like) and may provide another notification to the EMV regarding safety of the EMV proceeding through the intersection based on the changed information. For example, if the ICAS 102 provided an initial notification to the EMV that the user vehicle is not yielding but user-tracking information obtained after providing the initial notification indicates that the user vehicle has yielded, the ICAS 102 may provide another notification to the EMV indicating that the user vehicle is yielding and/or that the EMV may proceed safely through the intersection.

In some implementations, the ICAS 102 may provide, to the traffic control signal 106, the traffic control signal 107, a crosswalk signal, a traffic sign, a construction sign, street lighting, and/or the like, instructions to generate a visual alert for the EMV regarding safety of the EMV to proceed through the intersection. For example, the ICAS 102 may provide, to a crosswalk signal at the intersection, instructions to generate a visual alert (e.g., a unique lighting pattern, a symbol, a flashing signal, and/or the like) for the EMV. In some implementations, an operator of the EMV may be trained to recognize the visual alert as a warning of a predicted collision, an indication that the EMV may proceed safely through the intersection, and/or the like.

In this way, the ICAS 102 may provide the EMV with real-time traffic information regarding the safety of the EMV proceeding through the intersection to reduce the likelihood of a collision (e.g., due to a driver failing to yield right-of-way, failing to notice a change to a traffic signal, and/or the like). By reducing the likelihood of a collision when the EMV approaches the intersection, the ICAS 102 conserves the vehicle resources, equipment resources, financial resources, and/or the like that would otherwise be consumed by damage to vehicles, repairs to vehicles and/or roadside equipment, the use of tow trucks, and/or the like.

As shown in FIG. 1C, and by reference number 140, the ICAS 102 may provide, to the user device 103, intersection safety information for the user. For example, the ICAS 102 may provide, to the user device 103, a notification including information regarding safety of the user vehicle proceeding through the intersection based on the determination of whether the EMV is predicted to collide with the user vehicle.

In some implementations, the ICAS 102 may provide, to the user device 103, a notification including an audible alert, a visual alert, an instruction to yield, information regarding the EMV (e.g., a type of the EMV (e.g., a fire engine, a ladder truck, an emergency medical transport vehicle, a law-enforcement vehicle, and/or the like), a color of the EMV, the speed of the EMV, and/or the like), information regarding a lane in which the EMV is traveling, and/or a directional indicator of the location of the EMV with respect to the user vehicle. For example, the ICAS 102 may provide, to the user device 103, a message that the EMV is ahead of the user vehicle and that the EMV is located to the southeast of the user vehicle.

In this way, the ICAS 102 may provide the user device 103 with information regarding an approaching EMV to reduce the likelihood of a collision. By reducing the likelihood of a collision when the EMV approaches the intersection, the ICAS conserves the vehicle resources, equipment resources, financial resources, and/or the like that would otherwise be consumed by damage to vehicles, repairs to vehicles and/or roadside equipment, the use of tow trucks, and/or the like.

Additionally, or alternatively, the ICAS 102 may provide the user device 103 with information regarding an approaching EMV to assist the user vehicle with yielding right-of-way to the EMV. For example, the ICAS 102 may provide the user device 103 with a message that the EMV is approaching from behind the user vehicle, which may cause the driver of the user vehicle to move the user vehicle such that the EMV may proceed past the user vehicle. In this way, the ICAS 102 may reduce the response time of the EMV to the emergency. By reducing the response time of the EMV to the emergency, the ICAS 102 conserves vehicle resources (e.g., fuel consumed while waiting for the user vehicle to yield and/or the like), equipment resources, financial resources, and/or the like that would otherwise be consumed by slow response times, which may lead to additional damage to property (e.g., buildings, vehicles, infrastructure, computer systems, and/or the like) and/or the like.

As shown in FIG. 1C, and by reference number 145, the ICAS 102 may provide, to the traffic control signal 107, instructions to provide a signal to the user. For example, the ICAS 102 may provide, to the traffic control signal 107 and based on the determination that the user vehicle is approaching the intersection, an instruction to provide a signal to stop the user vehicle. In some implementations, the traffic control signal 107 may provide the signal to the user vehicle using solid and/or flashing lights, arrows, symbols, and/or the like having different colors (e.g., red, yellow, and green).

In some implementations, the ICAS 102 may provide an instruction to the user vehicle rather than, or in addition to, the traffic control signal 107. For example, the ICAS 102 may provide, to the user vehicle, an instruction to proceed, stop, slow down, speed up, and/or the like. In some implementations, the user vehicle may perform an action based on the instruction, such as an action to automatically proceed, stop, slow down, speed up, and/or the like.

In some implementations, the ICAS 102 may provide, to the traffic control signal 106, instruction to provide a signal to the EMV. For example, the ICAS 102 may provide, to the traffic control signal 106 and based on the determination that the EMV is approaching the intersection, an instruction to provide a signal to permit the EMV to proceed through the intersection. In some implementations, the traffic control signal 106 may provide the signal to the EMV using solid and/or flashing lights, arrows, symbols, and/or the like having different colors (e.g., red, yellow, and green).

In some implementations, the ICAS 102 may provide an instruction to the EMV rather than, or in addition to, the traffic control signal 106. For example, the ICAS 102 may provide, to the EMV, an instruction to proceed, stop, slow down, speed up, and/or the like. In some implementations, the EMV may perform an action based on the instruction, such as an action to automatically proceed, stop, slow down, speed up, and/or the like.

Figure 1D:
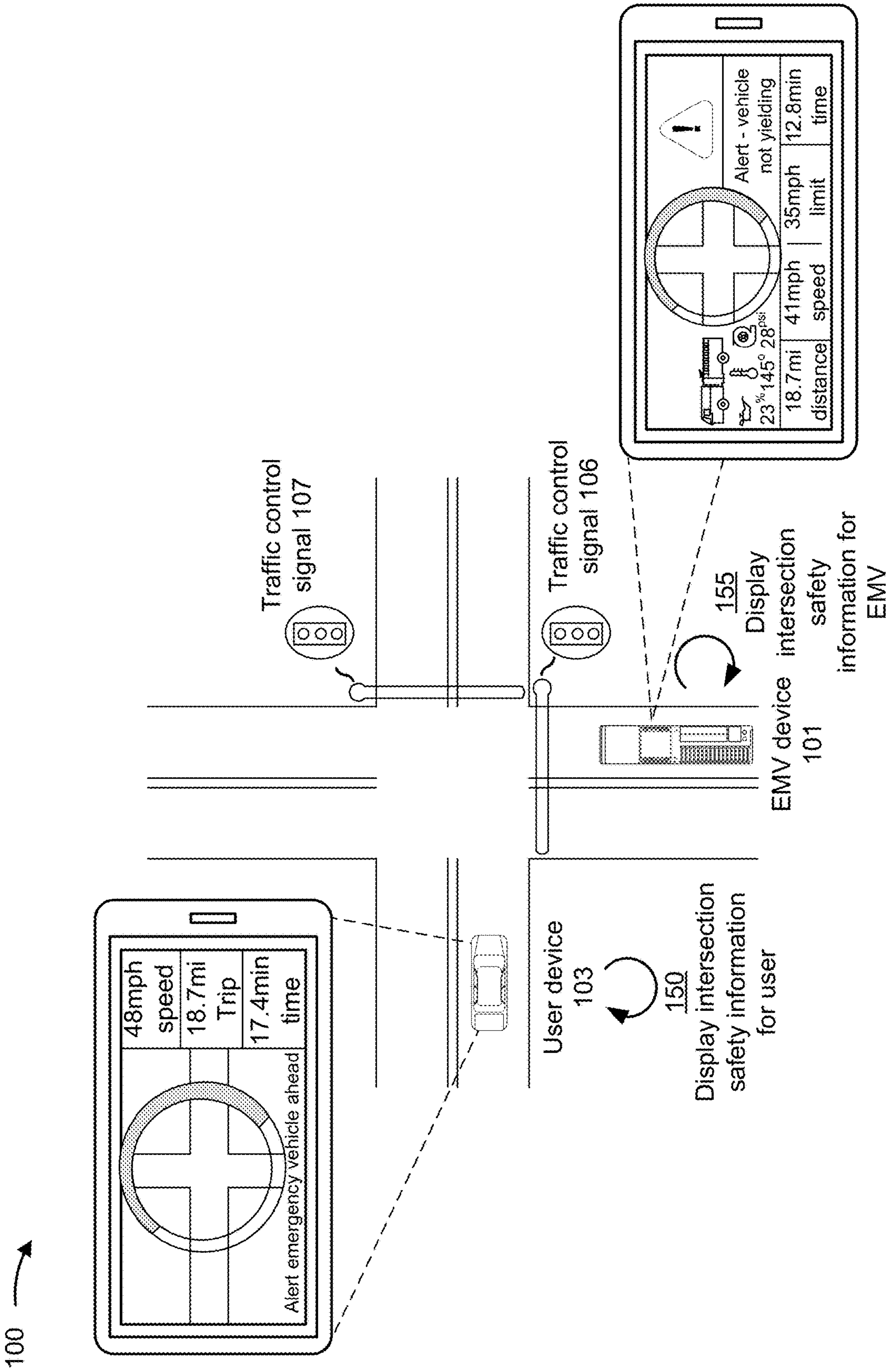

As shown in FIG. 1D, and by reference number 150, the user device 103 may display the intersection safety information for a user (e.g., a driver of the user vehicle, a passenger of the user vehicle, and/or the like). In some implementations, the user device 103 may display the intersection safety information for the user via a user interface that includes information based on the intersection safety information for the user.

For example, and as shown in FIG. 1D, the user interface may include a directional indicator of the location of the EMV with respect to the user vehicle (e.g., a circle with a shaded and/or differently colored portion indicative of the direction location of the EMV with respect to the user vehicle). Additionally, or alternatively, and as shown in FIG. 1D, the user interface may include text such as, "Alert emergency vehicle ahead," "Alert: do not enter the upcoming intersection! An emergency vehicle is approaching that intersection," and/or the like. In some implementations, the user interface may also include information regarding the user vehicle, such as a current speed, a trip mileage (e.g., a mileage to a destination, a mileage since startup of the user vehicle, and/or the like), a travel time (e.g., a time since startup of the vehicle and/or a beginning of a current trip, a predicted time to reach the destination, and/or the like), and/or the like. Additionally, or alternatively, the user device 103 may display a user interface including a distance of the EMV from the intersection, a distance of the user vehicle from the intersection, a map depicting a location of the user vehicle and a location of the EMV, and/or the like.

In this way, the user device 103 may provide the user with information regarding an approaching EMV to reduce the likelihood of a collision. By reducing the likelihood of a collision when the EMV approaches the intersection, the ICAS conserves the vehicle resources, equipment resources, financial resources, and/or the like that would otherwise be consumed by damage to vehicles, repairs to vehicles and/or roadside equipment, the use of tow trucks, and/or the like.

Additionally, or alternatively, the user device 103 may provide the user with information regarding an approaching EMV to assist the user with yielding right-of-way to the EMV. For example, the user device 103 may provide the user with a message that the EMV is approaching from behind the user vehicle, which may cause the user to move the user vehicle such that the EMV may proceed past the user vehicle. Additionally, or alternatively, the ICAS 102, based on the lane in which the EMV is traveling and/or the lane in which the user vehicle is traveling, may provide to the user device 103 and/or the user device 103 may provide the user a message including text, such as "An emergency vehicle is approaching from behind. Please move to the right immediately" and/or the like. In this way, the user device 103 may reduce the response time of the EMV to the emergency. By reducing the response time of the EMV to the emergency, the user device 103 conserves vehicle resources (e.g., fuel consumed while waiting for the user vehicle to yield and/or the like), equipment resources, financial resources, and/or the like that would otherwise be consumed by slow response times, which may lead to additional damage to property (e.g., buildings, vehicles, infrastructure, computer systems, and/or the like) and/or the like.

As shown in FIG. 1D, and by reference number 155, the EMV device 101 may display the intersection safety information for the EMV. In some implementations, the EMV device 101 may display the intersection safety information for the EMV via a user interface that includes information based on the intersection safety information for the EMV.

For example, and as shown in FIG. 1D, the user interface displayed by the EMV device 101 may include a directional indicator of the location of the user vehicle with respect to the EMV (e.g., a circle with a shaded and/or differently colored portion indicative of the direction location of the user vehicle with respect to the EMV, a circle with a differently colored portion indicative of the direction location of the user vehicle with respect to the EMV where the color corresponds to a likelihood of a collision (e.g., red for high likelihood, yellow for medium likelihood, green for low likelihood, and/or the like), and/or the like). Additionally, or alternatively, and as shown in FIG. 1D, the user interface may include text such as, "Alert—vehicle not yielding." Additionally, or alternatively, the EMV device 101 may display a user interface including a distance of the EMV from the intersection, a distance of the user vehicle from the intersection, a map depicting a location of the user vehicle and a location of the EMV, and/or the like. In this way, the EMV device 101 may provide a driver and/or passenger of the EMV with information regarding an approaching vehicle to reduce the likelihood of a collision. By reducing the likelihood of a collision when the EMV approaches the intersection, the ICAS conserves the vehicle resources, equipment resources, financial resources, and/or the like that would otherwise be consumed by damage to vehicles, repairs to vehicles and/or roadside equipment, the use of tow trucks, and/or the like.

In some implementations, the EMV device 101 may display a user interface that includes information regarding a type of one or more vehicles approaching the intersection. For example, the ICAS 102 may provide, to the EMV device 101, a notification including information regarding a type of the user vehicle (e.g., automobile, van, pickup truck, box truck, tractor trailer, and/or the like) approaching the intersection, a type of other EMV approaching the intersection, and/or the like. In some implementations, the EMV device 101 may display a user interface that distinguishes types of vehicles using different colors for different types of vehicles. For example, the EMV device 101 may display a user interface that includes a blue indicator for a law-enforcement vehicle, a red indicator for a fire engine, a white indicator for an emergency medical transport vehicle, and/or the like. Additionally, or alternatively, the EMV device 101 may display a user interface that indicates (e.g., with color, with text, with symbols, and/or the like) whether another EMV approaching the intersection is responding to an emergency or not.

In some implementations, and as shown in FIG. 1D, the user interface may also include information regarding the EMV, such as a trip mileage (e.g., a mileage to a destination, a mileage since startup of the user vehicle, and/or the like), a current speed, a speed limit, a travel time (e.g., a time since startup of the vehicle and/or a beginning of a current trip, a predicted time to reach the destination, and/or the like), and/or the like. Additionally, or alternatively, and as shown in FIG. 1D, the user device may display a user interface that includes information regarding an engine of the EMV, such as a percentage of oil life remaining, a temperature of the engine, an oil pressure measurement, and/or the like. In some implementations, the user device may display a user interface that includes information regarding an amount of water in a storage tank of the EMV, an inventory of a drug cataloging system in the EMV, and/or the like.

In some implementations, the ICAS 102 may determine, based on the EMV-tracking information and the user-tracking information, that the user vehicle failed to yield to the EMV and may provide, to a law enforcement agency, information regarding the user vehicle and the determination that the user vehicle failed to yield to the EMV. For example, the ICAS 102 may provide a notification to the law enforcement agency that the user vehicle failed to yield to the EMV and provide the law enforcement agency with access to the smart contract for the user vehicle containing the event history based on the user-tracking information and notifications provided by the ICAS 102 to the user device 103.

Figure 1E:
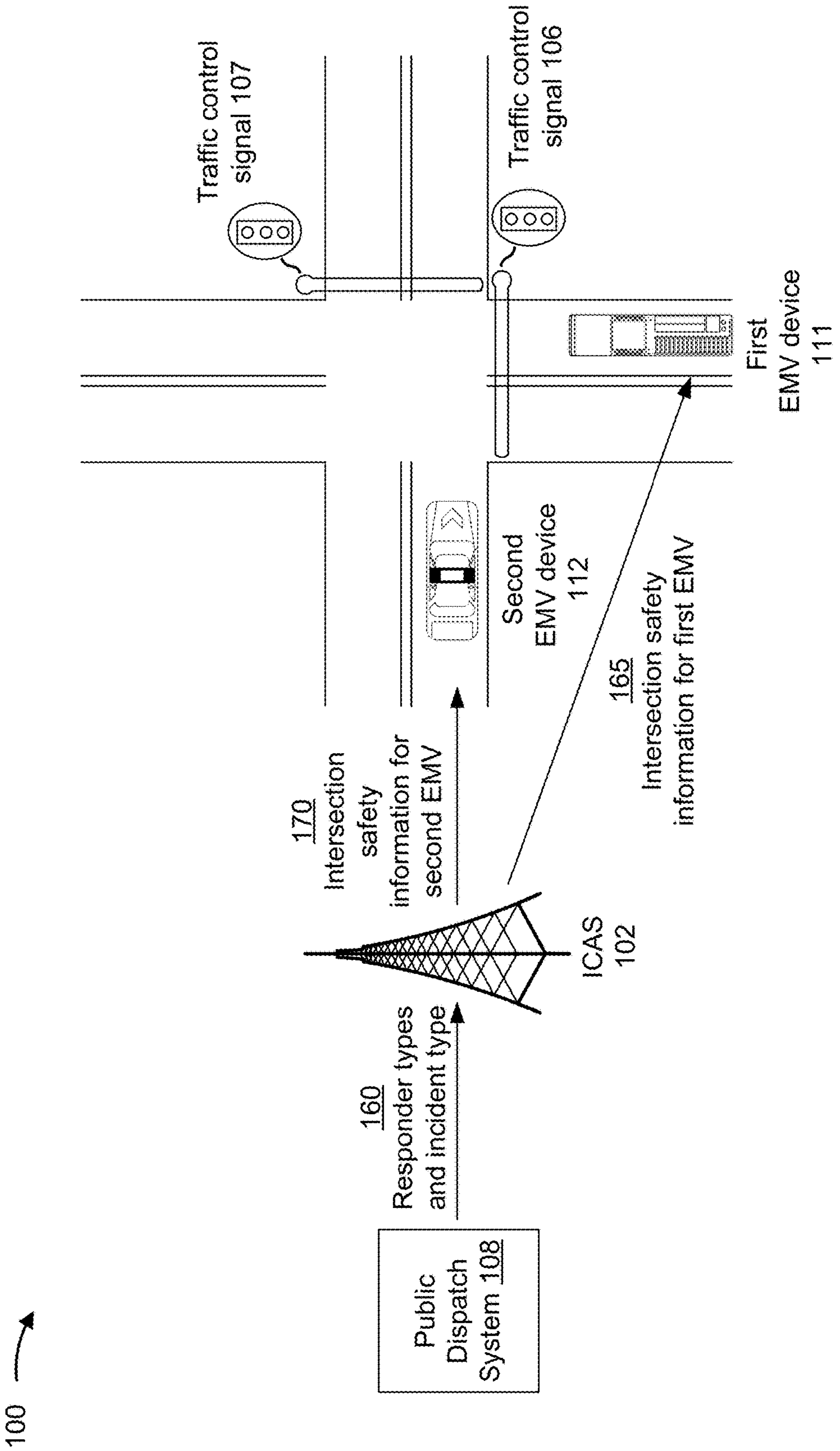

As shown in FIG. 1E, and by reference number 160, the public dispatch system 108 may provide, to the ICAS 102, responder types and an incident type. In some implementations, the public dispatch system 108 may be used to coordinate responses to incidents on a citywide, countywide, and/or regional basis by providing instructions to different types of EMVs (e.g., a fire engine, a ladder truck, an emergency medical transport vehicle, a law-enforcement vehicle, and/or the like) to respond to different types of incidents (e.g., a fire emergency, a medical emergency, a vehicle collision, a downed powerline, a public safety emergency, and/or the like). In some implementations, the public dispatch system 108 may provide, to the ICAS 102, information indicating that a first EMV associated with the first EMV device 111 has a responder type of fire engine, that a second EMV associated with the second EMV device 112 has a responder type of law-enforcement vehicle, and that the first EMV and the second EMV are responding to an emergency having an incident type of structure fire.

In some implementations, the first EMV device 111 and/or the second EMV device 112 may provide, to the ICAS 102, a communication including EMV-tracking information as described herein with respect to the EMV device 101. For example, the first EMV device 111 and/or the second EMV device 112 may provide, to the ICAS 102 and based on the first EMV and/or the second EMV entering emergency response mode, a communication including EMV-tracking information for the first EMV and/or the second EMV.

In some implementations, the ICAS 102 may determine whether the first EMV and/or the second EMV is approaching an intersection, whether a user vehicle is approaching the intersection, and/or whether the first EMV and/or the second EMV is predicted to collide with the user vehicle as described with respect to FIGS. 1A-1B. Additionally, or alternatively, the ICAS 102 may determine whether the first EMV and the second EMV are approaching the same intersection and whether the first EMV is predicted to collide with the second EMV.

As shown in FIG. 1E, and by reference number 165, the ICAS 102 may provide, to the first EMV device 111, intersection safety information for the first EMV. For example, the ICAS 102 may provide, to the first EMV device 111, a notification including information regarding safety of the first EMV proceeding through the intersection based on a determination of whether the first EMV is predicted to collide with the user vehicle as described with respect to FIGS. 1A-1D and/or based on a determination of whether the first EMV is predicted to collide with the second EMV. In some implementations, the notification may include an audible alert, a visual alert, information regarding one or more user vehicles approaching the intersection, information regarding the second EMV, information regarding a lane in which the one or more user vehicles are traveling, information regarding a lane in which the second EMV is traveling, a directional indicator of a location of the one or more user vehicles with respect to the first EMV, a directional indicator of a location of the second EMV with respect to the first EMV, a message indicating that the first EMV may safely proceed through the intersection, and/or the like.

As shown in FIG. 1E, and by reference number 170, the ICAS 102 may provide, to the second EMV device 112, intersection safety information for the second EMV. For example, the ICAS 102 may provide, to the second EMV device 112, a notification including information regarding safety of the second EMV proceeding through the intersection based on a determination of whether the first EMV is predicted to collide with the user vehicle as described with respect to FIGS. 1A-1D and/or based on a determination of whether the first EMV is predicted to collide with the second EMV. In some implementations, the notification may include an audible alert, a visual alert, information regarding one or more user vehicles approaching the intersection, information regarding the first EMV, information regarding a lane in which the one or more user vehicles are traveling, information regarding a lane in which the first EMV is traveling, a directional indicator of a location of the one or more user vehicles with respect to the second EMV, a directional indicator of a location of the first EMV with respect to the second EMV, a message indicating that the second EMV may safely proceed through the intersection, and/or the like.

In some implementations, the ICAS 102 may provide, to the first EMV device 111 and/or the second EMV device 112, intersection safety information based on the responder type of the first EMV, the responder type of the second EMV, and/or the incident type. For example, if the first EMV is a fire engine, the second EMV is a law-enforcement vehicle, and the incident type is a structure fire, the ICAS 102 may provide, to the second EMV device 112, intersection safety information that includes instructions to yield to the first EMV. Additionally, or alternatively, the ICAS 102 may provide, to the traffic control signal 106 and/or the traffic control signal 107, instructions to provide a signal to permit the first EMV to proceed through the intersection and/or a signal to stop the second EMV in a manner similar to that described with respect to FIG. 1C.

In some implementations, the ICAS 102 may provide an instruction to the first EMV and/or the second EMV rather than, or in addition to, the traffic control signal 106 and/or the traffic control signal 107. For example, the ICAS 102 may provide, to the first EMV and/or the second EMV, an instruction to proceed, stop, slow down, speed up, and/or the like. In some implementations, the first EMV and/or the second EMV may perform an action based on the instruction, such as an action to automatically proceed, stop, slow down, speed up, and/or the like.

In some implementations, the ICAS 102 may perform an action based on drug inventories in the first EMV and/or the second EMV and the incident type. For example, the ICAS 102 may receive, from the first EMV device 111, information regarding a first drug inventory in the first EMV, and may receive, from the second EMV device 112, information regarding a second drug inventory in the second EMV. In some implementations, the ICAS 102 may provide, to a traffic control system (e.g., the traffic control signal 106 and/or the traffic control signal 107) and based on the first drug inventory, the second drug inventory, and the incident type, instructions to change traffic control signals at the intersection to provide the first EMV and/or the second EMV with right-of-way.

Additionally, or alternatively, the ICAS 102 may provide, to the first EMV and/or the second EMV and based on the first drug inventory, the second drug inventory, and the incident type, an instruction to proceed, stop, slow down, speed up, and/or the like. In some implementations, the first EMV and/or the second EMV may perform an action based on the instruction, such as an action to automatically proceed, stop, slow down, speed up, and/or the like.

In some implementations, the ICAS 102 may provide, to the first EMV and based on the first drug inventory, the second drug inventory, and the incident type, instructions to yield to the second EMV. For example, the ICAS 102 may determine that the second drug inventory includes a drug for responding to the incident type, determine that the first drug inventory does not include the drug, and may provide, to the first EMV, instructions to yield to the second EMV.

In some implementations, the ICAS 102 may perform an action based on the type of incident and characteristics of the first EMV and the second EMV, such as responder type, personnel in the EMV, characteristics of the personnel in the EMV (e.g., experience levels, certifications, skills, training, and/or the like), a type of equipment in the EMV, a type of medical supplies in the EMV (e.g., drug inventory, medical equipment, and/or the like), and/or the like. For example, the first EMV device 111 and/or the second EMV device 112 may provide the characteristics of the first EMV and the second EMV to the ICAS 102. In some implementations, the ICAS 102 may determine whether the first EMV or the second EMV should be given right-of-way based on the type of incident and characteristics of the first EMV and the second EMV.

In some implementations, the ICAS 102 may use a machine learning model to determine whether the first EMV or the second EMV should be given the right-of-way based on the type of incident and characteristics of the first EMV and the second EMV. For example, the ICAS 102 may train the machine learning model based on one or more characteristics of the first EMV and the second EMV, such as responder type, personnel in the EMV, characteristics of the personnel in the EMV (e.g., experience levels, certifications, skills, training, and/or the like), a type of equipment in the EMV, a type of medical supplies in the EMV (e.g., drug inventory, medical equipment, and/or the like), and/or the like. The ICAS 102 may train the machine learning model, according to the one or more parameters, using historical data associated with characteristics of EMVs, types of incidents, responses to incidents, and outcomes of response to incidents. Using the historical data and the one or more parameters as inputs to the machine learning model, the ICAS 102 may determine whether the first EMV or the second EMV should be given right-of-way.

For example, the ICAS 102 may use a machine learning model to determine whether a first law-enforcement vehicle driven by an officer with twenty years of experience or a second law-enforcement vehicle driven by an officer with three years of experience should be given right-of-way when responding to a shoplifting incident. The machine learning model may determine that the first law-enforcement vehicle should be given right-of-way because the historical data indicates that a positive outcome of a response to a shoplifting incident is more likely to occur when an officer first responding to the incident has more than ten years of experience.

In this way, the ICAS 102 may provide intersection safety information to the first EMV device 111 and/or the second EMV device 112 and instructions to the traffic control signal 106 and/or the traffic control signal 107 to control the flow of traffic through the intersection. These instructions not only reduce the likelihood of a collision but may reduce response time of EMVs having a responder type that is more critical to responding to the type of incident identified by the public dispatch system 108 than other EMVs passing through the intersection. By reducing the response time of the more critical type of EMVs to the incident, the ICAS 102 conserves vehicle resources (e.g., fuel consumed while waiting for the less critical type of EMVs to yield and/or the like), equipment resources, financial resources, and/or the like that would otherwise be consumed by slow response times that may lead to unnecessary damage to property (e.g., buildings, vehicles, infrastructure, computer systems, and/or the like) and/or the like.

Figure 1F:
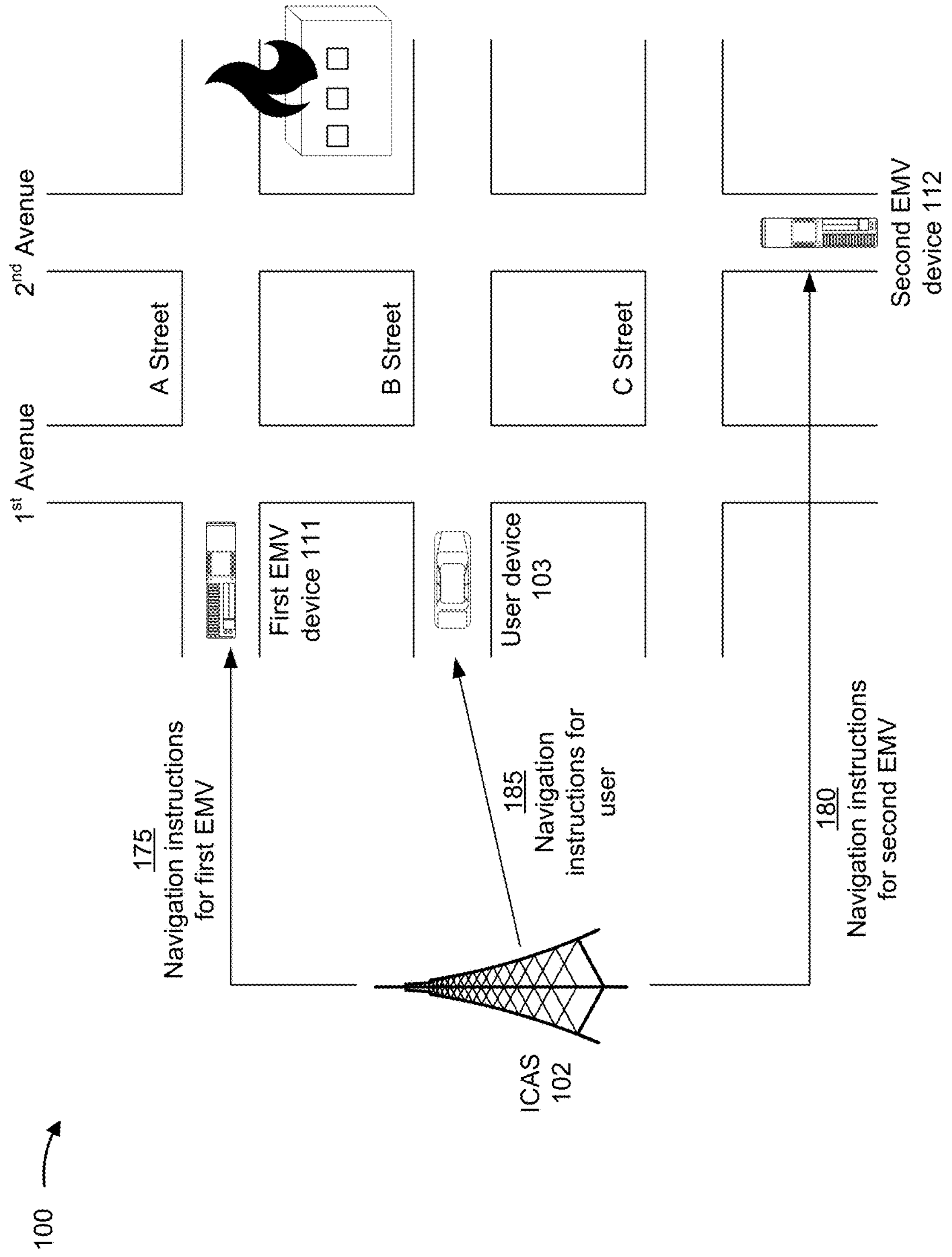

As shown in FIG. 1F, the first EMV device 111 may be associated with a first fire engine, the second EMV device 112 may be associated with a second fire engine, and the user device 103 may be associated with the user vehicle. In some implementations, and as shown in a map of FIG. 1F, the first fire engine and the second fire engine may be responding to a building fire off Second Avenue between A Street and B Street, and the user vehicle may be located west of First Avenue and traveling east on B Street.

As shown in FIG. 1F, and by reference number 175, the ICAS 102 may provide, to the first EMV device 111, navigation instructions for the first EMV. For example, the ICAS 102 may provide, to the first EMV device 111, navigation instructions for the first EMV device 111 to provide (e.g., via display, audio prompts, and/or the like) to a driver and/or passenger of the first EMV to direct the first EMV to the building fire. Additionally, or alternatively, the ICAS 102 may provide the navigation instructions for the first EMV to a first navigation system associated with the first EMV.

As shown in FIG. 1F, and by reference number 180, the ICAS 102 may provide, to the second EMV device 112, navigation instructions for the second EMV. For example, the ICAS 102 may provide, to the second EMV device 112, navigation instructions for the second EMV device 112 to provide (e.g., via display, audio prompts, and/or the like) to a driver and/or passenger of the second EMV to direct the second EMV to the building fire. Additionally, or alternatively, the ICAS 102 may provide the navigation instructions for the second EMV to a second navigation system associated with the second EMV.

In some implementations, the ICAS 102 may provide, to the first EMV device 111, navigation instructions for the first EMV and, to the second EMV device 112, navigation instructions for the second EMV, where the navigation instructions for the first EMV and the navigation instructions for the second EMV reduce the likelihood that the first EMV and the second EMV will collide. For example, the navigation instructions for the first EMV and the navigation instructions for the second EMV may prevent the first EMV and the second EMV from passing through an intersection within a time period (e.g., 10 seconds, 20 seconds, 30 seconds, a minute, and/or the like) of each other.

In some implementations, the ICAS 102 may provide navigation instructions for the first EMV and navigation instructions for the second EMV that prevent the first EMV and the second EMV from passing through the same intersection. Additionally, or alternatively, the ICAS 102 may provide navigation instructions for the first EMV to direct the first EMV to a first side of a building and navigation instructions for the second EMV to direct the second EMV to a second side of the building. For example, the ICAS 102 may provide navigation instructions for the first EMV to proceed east on A Street and stop on the east side of Second Avenue on the north side of the building fire, and may provide instructions for the second EMV to proceed north on Second Avenue, turn right and/or east on B Street, and stop on the south side of the building fire. In this example, the ICAS 102 may provide navigation instructions that reduce the likelihood that the first EMV and the second EMV will collide by preventing the first EMV and the second EMV from passing through the same intersection and that reduce congestion at the building fire by directing the first EMV and the second EMV to different sides of the building fire.

In some implementations, the ICAS 102 may receive obstructive-vehicle-tracking information (e.g., from a device associated with an obstructive vehicle, from the obstructive vehicle, and/or the like) and may provide, based on the obstructive-vehicle-tracking information, navigation instructions for the first EMV and/or the second EMV to direct the first EMV and/or the second EMV on a route that avoids the obstructive vehicle. For example, the obstructive vehicle may be a type of vehicle that may obstruct a normal flow of traffic, such as a school bus, a public transit vehicle, a snow plow, a construction vehicle, and/or the like.

Additionally, or alternatively, the ICAS 102 may receive obstructive-vehicle-tracking information and may provide, to the first EMV device 111 and/or the second EMV device 112 and based on the obstructive-vehicle-tracking information, a notification to alert the first EMV and/or the second EMV of a hazard associated with the obstructive vehicle. For example, the ICAS 102 may receive obstructive-vehicle-tracking information indicating that a school bus is loading and/or unloading children on a route of the first EMV and/or the second EMV, and may provide, to the first EMV device 111 and/or the second EMV device 112 and based on the obstructive-vehicle-tracking information, a notification warning an operator of the first EMV and/or the second EMV of the hazard.

As shown in FIG. 1F, and by reference number 185, the ICAS 102 may provide, to the user device 103, navigation instructions for the user. In some implementations, the ICAS 102 may provide, to the user device 103, navigation instructions for the user device 103 to provide (e.g., via display, audio prompts, and/or the like) to a driver and/or passenger of the user vehicle to direct the user vehicle away from a route of the first EMV and/or the second EMV, direct the user vehicle away from the building fire, and/or the like. For example, the ICAS 102 may provide, to the user device 103, navigation instructions for the user vehicle to turn right and/or south on First Avenue, left and/or east on C Street, and to proceed east on C Street. In this example, the ICAS 102 may provide navigation instructions that reduce the likelihood that the user vehicle will collide with the first EMV and/or the second EMV and direct the user vehicle away from the building fire. Additionally, or alternatively, the ICAS 102 may provide the navigation instructions for the user vehicle to a navigation system associated with the user vehicle.

In some implementations, the ICAS 102 may provide, based on the obstructive-vehicle-tracking information, navigation instructions for the user vehicle to direct the user vehicle on a route that avoids the obstructive vehicle. For example, the obstructive vehicle may be a type of vehicle that may obstruct a normal flow of traffic, such as a school bus, a public transit vehicle, a snow plow, a construction vehicle, and/or the like. Additionally, or alternatively, the ICAS 102 may receive obstructive-vehicle-tracking information and may provide, to the user device 103 and based on the obstructive-vehicle-tracking information, a notification to alert the user vehicle of a hazard associated with the obstructive vehicle. For example, the ICAS 102 may receive obstructive-vehicle-tracking information indicating that a school bus is loading and/or unloading children on a route of the user vehicle, and may provide, to the user device 103 and based on the obstructive-vehicle-tracking information, a notification warning a driver of the user vehicle of the hazard.

In this way, the ICAS 102 may provide the first EMV, the second EMV, and/or the user vehicle with real-time traffic information regarding the safety of proceeding through a roadway (e.g., an intersection) and navigation instructions to reduce the likelihood of a collision (e.g., due to a driver failing to yield right-of-way, failing to notice a change to a traffic signal, and/or the like). By reducing the likelihood of a collision when the first EMV, the second EMV, and/or the user vehicle approaches the intersection, the ICAS 102 conserves the vehicle resources, equipment resources, financial resources, and/or the like that would otherwise be consumed by damage to vehicles, repairs to vehicles and/or roadside equipment, the use of tow trucks, and/or the like.

In some implementations, the ICAS 102 may receive tracking information from other types of vehicles that require user vehicles to yield, such as school buses. For example, a bus device associated with a school bus may provide, to the ICAS 102, a communication indicating that the school bus has activated a stop signal for passing vehicles (e.g., to load and/or unload children from the bus and/or the like) and bus-tracking information (e.g., a location of the school bus, a direction of travel of the school bus, a lane in which the school bus is located, and/or the like).

In some implementations, the ICAS 102 may provide, based on the bus-tracking information and the user-tracking information, a notification to the user device 103 that the school bus is stopped. For example, the ICAS 102 may provide a notification including information regarding the school bus, instructions for the user vehicle to yield to the stop signal of the school bus, and/or the like.

In some implementations, the ICAS 102 may determine, based on the bus-tracking information and the user-tracking information, that the user vehicle failed to yield to the stop signal of the school bus and may provide, to a law enforcement agency, information regarding the user vehicle and the determination that the user vehicle failed to yield to the stop signal of the school bus. For example, the ICAS 102 may provide a notification to the law enforcement agency that the user vehicle failed to yield to the stop signal of the school bus and provide the law enforcement agency with access to the smart contract for the user vehicle containing the event history based on the user-tracking information and notifications provided by the ICAS 102 to the user device 103.

As indicated above, FIGS. 1A-1F are is provided as an example. Other examples can differ from what is described with regard to FIGS. 1A-1F. For example, the ICAS 102 may monitor EMV-tracking information while the EMV is in an emergency response mode, determine whether the EMV is approaching a drivable location (e.g., a left turn, a right turn, a roundabout, an intersection of two roads that cross each other, an intersection of more than two roads, an intersection at which a first road does not pass through a second road and vehicles on the first road must turn right or left onto the second road, such as a "T" intersection and/or a "Y" intersection, and/or the like), one or more lanes merging with one or more other lanes, for example, an on-ramp, an off-ramp, and/or the like. In some implementations, the ICAS 102 may determine whether the EMV is predicted to collide with the user vehicle at the drivable location and provide notifications to the EMV and the user vehicle. Although FIGS. 1A-1F provide an example involving an intersection of two roads that cross each other, other examples may involve another drivable location. Accordingly, where the example of FIGS. 1A-1F refer to an intersection, the example may also be applied to a drivable location.

The number and arrangement of devices shown in FIGS. 1A-1F are provided as one or more examples. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of example implementations 100 may perform one or more functions described as being performed by another set of devices of example implementations 100.

Figure 2:
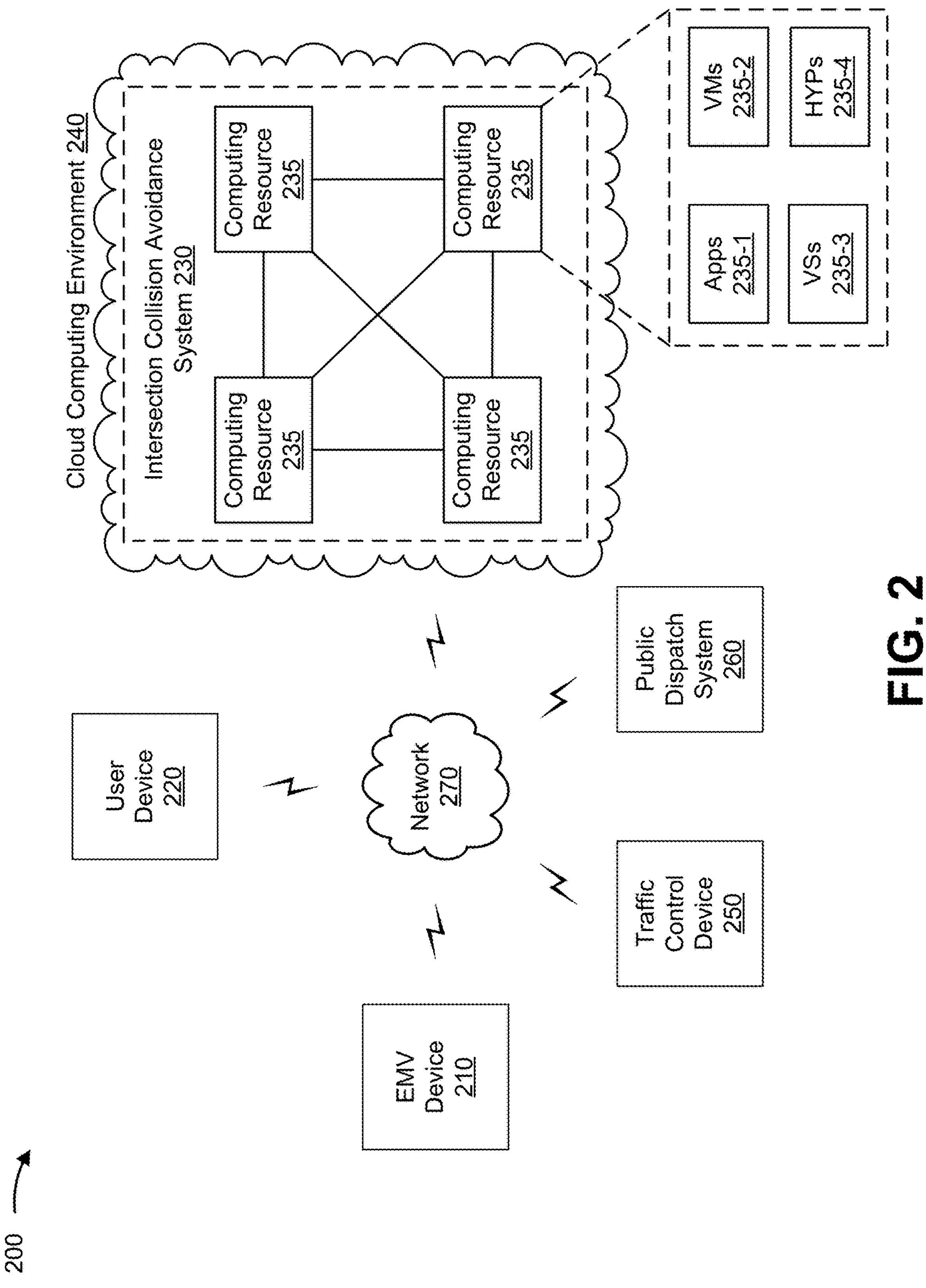
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include EMV device 210, user device 220, ICAS 230, cloud computing environment 240, traffic control device 250, public dispatch system 260, and network 270. In some implementations, the EMV device 101, the first EMV device 111, and/or the second EMV device 112 of FIG. 1 may include the EMV device 210. In some implementations, the user device 103 of FIG. 1 may include the user device 220. In some implementations, the ICAS 102 of FIG. 1 may include the ICAS 230. In some implementations, the traffic control signal 106 and/or the traffic control signal 107 of FIG. 1 may include the traffic control device 250. In some implementations, the public dispatch system 108 of FIG. 1 may include the public dispatch system 260. Devices of environment 200 may interconnect via wired connections, wireless connections, or a combination of wired and wireless connections.

EMV device 210 includes one or more devices capable of receiving, generating, storing, processing, and/or providing information associated with emergencies, instructions to respond to emergencies, vehicle tracking, safety of intersections, other vehicles, navigation instructions, and/or the like. For example, EMV device 210 may include an in-vehicle mobile data terminal, a user device, an auxiliary device mounted in an EMV, a head-mounted display device, a heads-up display, an in-vehicle warning system, or a similar type of device.

User device 220 includes one or more devices capable of receiving, generating, storing, processing, and/or providing information associated with vehicle tracking, safety of intersections, other vehicles, navigation instructions, and/or the like. For example, user device 220 may include a network-connected device, an in-vehicle system, a mobile data terminal, a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

ICAS 230 includes one or more computing resources assigned to receive vehicle tracking information, communications from devices, and information regarding emergencies, monitor tracking information of vehicles near intersections, determine whether vehicles are predicted to collide, provide instructions to traffic control systems, and provide information and instructions to devices. For example, ICAS 230 may be a platform implemented by cloud computing environment 240 that may receive vehicle tracking information, communications from devices, and information regarding emergencies, monitor tracking information of vehicles near intersections, determine whether vehicles are predicted to collide, provide instructions to traffic control systems, and provide information and instructions to devices. In some implementations, ICAS 230 is implemented by computing resources 235 of cloud computing environment 240.

ICAS 230 may include a server device or a group of server devices. In some implementations, ICAS 230 may be hosted in cloud computing environment 240. Notably, while implementations described herein may describe ICAS 230 as being hosted in cloud computing environment 240, in some implementations, ICAS 230 may be non-cloud-based or may be partially cloud-based.

Cloud computing environment 240 includes an environment that delivers computing as a service, whereby shared resources, services, and/or the like may be provided to receive vehicle tracking information, communications from devices, and information regarding emergencies, monitor tracking information of vehicles near intersections, determine whether vehicles are predicted to collide, provide instructions to traffic control systems, and provide information and instructions to devices. Cloud computing environment 240 may provide computation, software, data access, storage, and/or other services that do not require end-user knowledge of a physical location and configuration of a system and/or a device that delivers the services. As shown, cloud computing environment 240 may include ICAS 230.

Computing resource 235 includes one or more personal computers, workstation computers, server devices, or another type of computation and/or communication device. In some implementations, computing resource 235 may host ICAS 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by EMV device 210, user device 220, traffic control device 250, and/or public dispatch system 260. Application 235-1 may eliminate a need to install and execute the software applications on EMV device 210, user device 220, traffic control device 250, and/or public dispatch system 260. For example, application 235-1 may include software associated with ICAS 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., EMV device 210, user device 220, traffic control device 250, and/or public dispatch system 260), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the "guest operating systems" and may manage the execution of the guest operating systems. Multiple instances of a variety of operating systems may share virtualized hardware resources.

Traffic control device 250 includes one or more devices capable of receiving, generating, storing, processing, and/or providing information associated with providing signals, instructions, and/or messages to vehicles. For example, traffic control device 250 may include a traffic light having one or more lights and/or displays for providing signals, instructions, and/or messages to vehicles, a crosswalk signal having one or more lights and/or displays for providing signals, instructions, and/or messages to pedestrians, a display board for providing signals, instructions, and/or messages to drivers, vehicles, and/or pedestrians, and/or the like.

Public dispatch system 260 includes one or more devices capable of receiving, generating, storing, processing, and/or providing information associated with emergencies, incidents, EMVs, tracking information, and/or the like. For example, public dispatch system may include one or more server devices, one or more communication and/or computing devices, such as a mobile phone (e.g., a smart phone, a radiotelephone, etc.), a laptop computer, a tablet computer, a handheld computer, a desktop computer, or a similar type of device.

Network 270 includes one or more wired and/or wireless networks. For example, network 270 may include a fiber optic-based network, an intranet, the Internet, a cloud computing network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
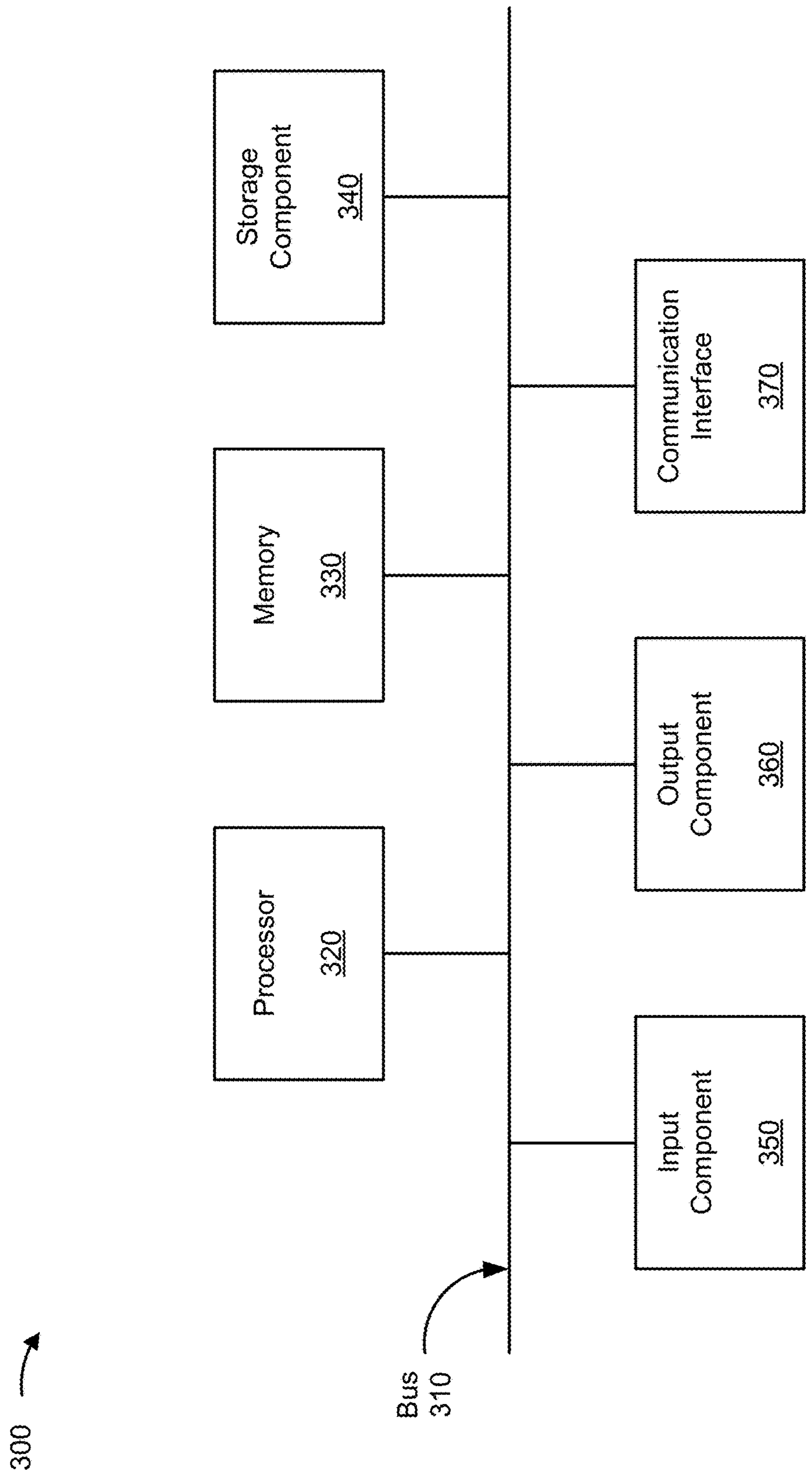
FIG. 3 is a diagram of example components of one or more devices of FIG. 2.

FIG. 3 is a diagram of example components of a device 300. Device 300 may correspond to EMV device 210, user device 220, ICAS 230, computing resource 235, traffic control device 250, and/or public dispatch system 260. In some implementations, EMV device 210, user device 220, ICAS 230, computing resource 235, traffic control device 250, and/or public dispatch system 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
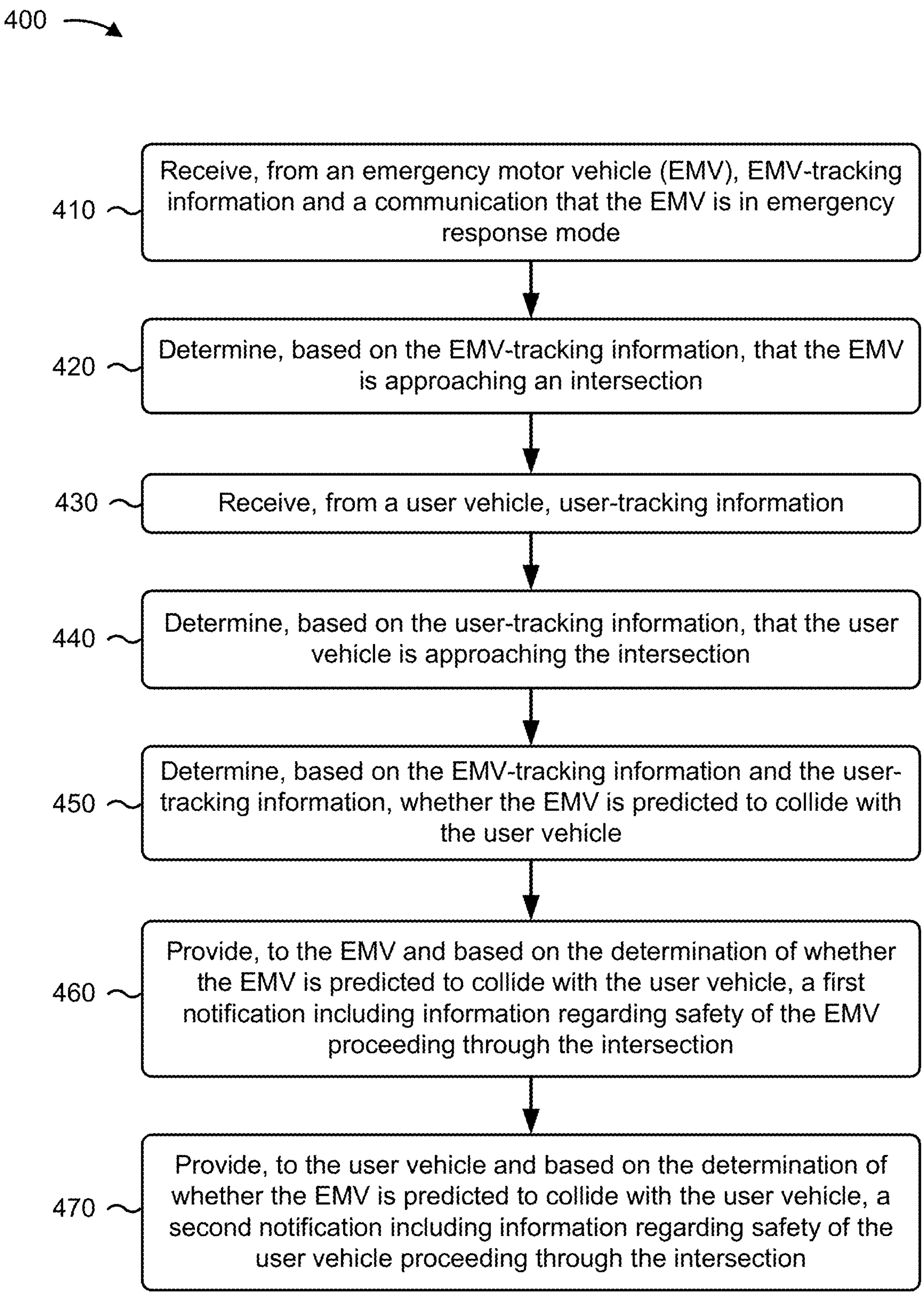
FIG. 4 is a flow chart of an example process for providing information regarding safety of a vehicle proceeding through the intersection.

FIG. 4 is a flow chart of an example process 400 for providing information regarding safety of a vehicle proceeding through the intersection. In some implementations, one or more process blocks of FIG. 4 may be performed by ICAS 230. In some implementations, one or more process blocks of FIG. 4 may be performed by another device or a group of devices separate from or including ICAS 230, such as EMV device 210, user device 220, ICAS 230, computing resource 235, traffic control device 250, and public dispatch system 260.

As shown in FIG. 4, process 400 may include receiving, from an EMV, EMV-tracking information and a communication that the EMV is in emergency response mode (block 410). For example, the ICAS (e.g., using processor 320, memory 330, storage component 340, input component 350, output component 360, communication interface 370, and/or the like) may receive, from an EMV, EMV-tracking information and a communication that the EMV is in emergency response mode, as described above. In some implementations, the EMV-tracking information indicates a location of the EMV, a direction of travel of the EMV, an intended destination of the EMV, activated turn signals indicative of an intended change in the direction of travel of the EMV, and/or a speed of the EMV. In some implementations, process 400 may include receiving, from a second device associated with an EMV, EMV-tracking information and a communication that the EMV is in emergency response mode, wherein the EMV-tracking information indicates a location of the EMV, a direction of travel of the EMV, activated turn signals indicative of an intended change in the direction of travel of the EMV, and/or a speed of the EMV. In some implementations, the second device includes an in-vehicle mobile data terminal, a mobile device of an operator in the EMV, an auxiliary device mounted in the EMV, a head-mounted display device, a heads-up display, and/or an in-vehicle warning system.

As further shown in FIG. 4, process 400 may include determining, based on the EMV-tracking information, that the EMV is approaching an intersection (block 420). For example, the ICAS (e.g., using processor 320, memory 330, storage component 340, input component 350, output component 360, communication interface 370, and/or the like) may determine, based on the EMV-tracking information, that the EMV is approaching an intersection, as described above.

As further shown in FIG. 4, process 400 may include receiving, from a user vehicle, user-tracking information (block 430). For example, the ICAS (e.g., using processor 320, memory 330, storage component 340, input component 350, output component 360, communication interface 370, and/or the like) may receive, from a user vehicle, user-tracking information, as described above. In some implementations, the user-tracking information indicates a location of the user vehicle, a direction of travel of the user vehicle, and/or a speed of the user vehicle. In some implementations, process 400 may include receiving, from a third device associated with a user vehicle, user-tracking information, wherein the user-tracking information indicates a location of the user vehicle, a direction of travel of the user vehicle, and/or a speed of the user vehicle. In some implementations, the third device is a mobile device of a user in the user vehicle or a network-connected device installed in the user vehicle.

As further shown in FIG. 4, process 400 may include determining, based on the user-tracking information, that the user vehicle is approaching the intersection (block 440). For example, the ICAS (e.g., using processor 320, memory 330, storage component 340, input component 350, output component 360, communication interface 370, and/or the like) may determine, based on the user-tracking information, that the user vehicle is approaching the intersection, as described above.

As further shown in FIG. 4, process 400 may include determining, based on the EMV-tracking information and the user-tracking information, whether the EMV is predicted to collide with the user vehicle (block 450). For example, the ICAS (e.g., using processor 320, memory 330, storage component 340, input component 350, output component 360, communication interface 370, and/or the like) may determine, based on the EMV-tracking information and the user-tracking information, whether the EMV is predicted to collide with the user vehicle, as described above.

As further shown in FIG. 4, process 400 may include providing, to the EMV and based on the determination of whether the EMV is predicted to collide with the user vehicle, a first notification including information regarding safety of the EMV proceeding through the intersection (block 460). For example, the ICAS (e.g., using processor 320, memory 330, storage component 340, input component 350, output component 360, communication interface 370, and/or the like) may provide, to the EMV and based on the determination of whether the EMV is predicted to collide with the user vehicle, a first notification including information regarding safety of the EMV proceeding through the intersection, as described above. In some implementations, process 400 may include providing, to the second device and based on the determination of whether the EMV is predicted to collide with the user vehicle, a first notification including information regarding safety of the EMV proceeding through the intersection. In some implementations, the first notification includes an audible alert, a visual alert, information regarding the user vehicle, information regarding a lane in which the user vehicle is traveling, a directional indicator of the location of the user vehicle with respect to the EMV, and/or a message indicating that the EMV may safely proceed through the intersection.

As further shown in FIG. 4, process 400 may include providing, to the user vehicle and based on the determination of whether the EMV is predicted to collide with the user vehicle, a second notification including information regarding safety of the user vehicle proceeding through the intersection (block 470). For example, the ICAS (e.g., using processor 320, memory 330, storage component 340, input component 350, output component 360, communication interface 370, and/or the like) may provide, to the user vehicle and based on the determination of whether the EMV is predicted to collide with the user vehicle, a second notification including information regarding safety of the user vehicle proceeding through the intersection, as described above. In some implementations, process 400 may include providing, to the third device and based on the determination of whether the EMV is predicted to collide with the user vehicle, a second notification including information regarding safety of the user vehicle proceeding through the intersection. In some implementations, the second notification includes an audible alert, a visual alert, an instruction to yield, information regarding the EMV, and/or a directional indicator of the location of the EMV with respect to the user vehicle.

Process 400 may include additional implementations, such as any single implementation or any combination of implementations described below and/or in connection with one or more other processes described elsewhere herein.

In some implementations, process 400 may include determining, after providing the first notification, that the information regarding safety of the EMV proceeding through the intersection has changed and providing a third notification including information based on the changed information regarding safety of the EMV proceeding through the intersection.

In some implementations, process 400 may include receiving, from the second device, an identifier, generating, based on the identifier, a hash, writing the hash to a smart contract, wherein the smart contract identifies the second device and that the second device is associated with the EMV, and storing, in the smart contract, data including the EMV-tracking information and the first notification provided to the second device.

In some implementations, process 400 may include receiving, from the third device, an identifier, generating, based on the identifier, a hash, writing the hash to a smart contract, wherein the smart contract identifies the third device and that the third device is associated with the user; storing, in the smart contract, data including the user-tracking information, and providing access to the smart contract to a public safety agency.

In some implementations, the first notification is provided to the second device to permit the second device to display the information regarding safety of the EMV proceeding through the intersection in a user interface along with information regarding an engine of the EMV, an amount of water in a storage tank of the EMV, and/or inventory of a drug cataloging system in the EMV.

In some implementations, process 400 may include receiving, from a second device associated with a first EMV, first-EMV-tracking information and a first communication that the first EMV is in emergency response mode and receiving, from a third device associated with a second EMV, second-EMV-tracking information and a second communication that the second EMV is in emergency response mode. Additionally, or alternatively, process 400 may include determining, based on the first-EMV-tracking information and the second-EMV-tracking information, that the first EMV and the second EMV are approaching an intersection and receiving, from a plurality of vehicles associated with a plurality of users, user-tracking information. In some implementations, process 400 may include determining, based on the user-tracking information, that at least one vehicle, of the plurality of vehicles, is approaching the intersection and determining, based on the first-EMV-tracking information, the second-EMV-tracking information, and the user-tracking information, whether a collision is predicted to occur. Additionally, or alternatively, process 400 may include providing, to the second device and based on the determination of whether a collision is predicted to occur, a first notification including information regarding safety of the first EMV proceeding through the intersection and providing, to the third device and based on the determination of whether a collision is predicted to occur, a second notification including information regarding safety of the second EMV proceeding through the intersection.

In some implementations, the first notification may include an audible alert, a visual alert, information regarding a vehicle of the at least one vehicle, information regarding the second EMV, information regarding a lane in which the vehicle is traveling, information regarding a lane in which the second EMV is traveling, a directional indicator of a location of the vehicle with respect to the first EMV, a directional indicator of a location of the second EMV with respect to the first EMV, and/or a message indicating that the first EMV may safely proceed through the intersection.

In some implementations, process 400 may include receiving, from a public safety dispatch system, a first responder type for the first EMV, a second responder type for the second EMV, and an incident type for an incident to which the first EMV and the second EMV are responding. Additionally, or alternatively, process 400 may include providing, to a traffic control system and based on the first responder type, the second responder type, and the incident type, instructions to change traffic control signals at the intersection to provide the first EMV and/or the second EMV with right-of-way. Additionally, or alternatively, process 400 may include providing, to the second device and based on the first responder type, the second responder type, and the incident type, instructions to yield to the second EMV. Additionally, or alternatively, process 400 may include providing, to a first navigation system associated with the first EMV and/or a second navigation system associated with the second EMV and based on the first responder type, the second responder type, and the incident type, instructions to provide a route preventing a collision between the first EMV and the second EMV.

In some implementations, process 400 may include providing, to a first navigation system associated with the first EMV, instructions to direct the first EMV to a first side of a building and providing, to a second navigation system associated with the second EMV, instructions to direct the second EMV to a second side of the building.

In some implementations, process 400 may include receiving, from a public safety dispatch system, an incident type for an incident to which the first EMV and the second EMV are responding, receiving, from the second device, information regarding a first drug inventory in the first EMV, and receiving, from the third device, information regarding a second drug inventory in the second EMV. Additionally, or alternatively, process 400 may include providing, to a traffic control system and based on the first drug inventory, the second drug inventory, and the incident type, instructions to change traffic control signals at the intersection to provide the first EMV and/or the second EMV with right-of-way. Additionally, or alternatively, process 400 may include providing, to the second device and based on the first drug inventory, the second drug inventory, and the incident type, instructions to yield to the second EMV.

In some implementations, process 400 may include providing, to a fourth device, instructions to generate a visual alert for the EMV regarding safety of the EMV to proceed through the intersection. In some implementations, the fourth device includes a traffic control signal, a crosswalk signal, a traffic sign, a construction sign, and/or street lighting.

In some implementations, process 400 may include providing, to a traffic control system, instructions to change traffic control signals at the intersection to provide the EMV with right-of-way.

In some implementations, process 400 may include providing, to a navigation system associated with a second user vehicle, instructions to direct the second user vehicle away from a route of the EMV.

In some implementations, process 400 may include determining, based on the EMV-tracking information and the user-tracking information, that the user vehicle failed to yield to the EMV and providing, to a law enforcement agency, information regarding the user vehicle and the determination that the user vehicle failed to yield to the EMV.

In some implementations, process 400 may include receiving, from a fourth device associated with an obstructive vehicle, obstructive-vehicle-tracking information and providing, to a navigation system associated with the EMV, instructions, based on the obstructive-vehicle-tracking information, to direct the EMV on a route that avoids the obstructive vehicle. In some implementations, the obstructive vehicle is a type of vehicle that obstructs traffic flow.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by a first device and from a second device associated with an emergency motor vehicle (EMV), EMV-tracking information and a communication that the EMV is in emergency response mode, wherein the EMV-tracking information indicates attributes of the EMV;

determining, by the first device and based on the EMV-tracking information, that the EMV is approaching a drivable location;

receiving, by the first device and from a user vehicle, user-tracking information;

determining, by the first device and based on the user-tracking information, that the user vehicle is approaching the drivable location;

determining, by the first device and based on the EMV-tracking information and the user-tracking information, whether the EMV is predicted to collide with the user vehicle;

providing, by the first device, to the second device, and based on the determination of whether the EMV is predicted to collide with the user vehicle, a first notification including information regarding safety of the EMV proceeding through an intersection; and providing, by the first device, to the user vehicle, and based on the determination of whether the EMV is predicted to collide with the user vehicle, a second notification including information regarding safety of the user vehicle proceeding through the intersection.

2. The method of claim 1, wherein the first notification includes an audible alert, a visual alert, information regarding the user vehicle, information regarding a lane in which the user vehicle is traveling, a directional indicator of the location of the user vehicle with respect to the EMV, and/or a message indicating that the EMV may safely proceed through the intersection.

3. The method of claim 1, wherein the second notification includes an audible alert, a visual alert, an instruction to yield, information regarding the EMV, and/or a directional indicator of the location of the EMV with respect to the user vehicle.

4. The method of claim 1, wherein the second device includes an in-vehicle mobile data terminal, a mobile device of an operator in the EMV, an auxiliary device mounted in the EMV, a head-mounted display device, a heads-up display, and/or an in-vehicle warning system.

5. The method of claim 1, wherein receiving user-tracking information comprises receiving user-tracking information from a mobile device of a user in the user vehicle or a network-connected device installed in the user vehicle.

6. The method of claim 1, further comprising:

determining, after providing the first notification, that the information regarding safety of the EMV proceeding through the intersection has changed; and providing a third notification including information based on the changed information regarding safety of the EMV proceeding through the intersection.

7. The method of claim 1, further comprising:

receiving, from the second device, an identifier;

generating, based on the identifier, a hash;

writing the hash to a smart contract, wherein the smart contract identifies the second device and that the second device is associated with the EMV; and storing, in the smart contract, data including the EMV-tracking information and the first notification provided to the second device.

8. The method of claim 1, further comprising:
receiving, from the user vehicle, an identifier;
generating, based on the identifier, a hash;
writing the hash to a smart contract, wherein the smart contract identifies the user vehicle;
storing, in the smart contract, data including the user-tracking information; and
providing access to the smart contract to a public safety agency.

9. The method of claim 1, wherein the first notification is provided to the second device to permit the second device to display the information regarding safety of the EMV proceeding through the intersection in a user interface along with information regarding an engine of the EMV, an amount of water in a storage tank of the EMV, and/or inventory of a drug cataloging system in the EMV.

10. A first device, comprising:
one or more processors configured to:
receive, from a second device associated with a first emergency motor vehicle (EMV), first-EMV-tracking information and a first communication that the first EMV is in emergency response mode;
receive, from a third device associated with a second EMV, second-EMV-tracking information and a second communication that the second EMV is in emergency response mode;
determine, based on the first-EMV-tracking information and the second-EMV-tracking information, that the first EMV and the second EMV are approaching an intersection;
receive, from a plurality of vehicles associated with a plurality of users, user-tracking information;
determine, based on the user-tracking information, that at least one vehicle, of the plurality of vehicles, is approaching the intersection;
determine, based on the first-EMV-tracking information, the second-EMV-tracking information, and the user-tracking information, whether a collision is predicted to occur;
provide, to the second device and based on the determination of whether a collision is predicted to occur, a first notification including information regarding safety of the first EMV proceeding through the intersection; and
provide, to the third device and based on the determination of whether a collision is predicted to occur, a second notification including information regarding safety of the second EMV proceeding through the intersection.

11. The first device of claim 10, wherein the first notification includes an audible alert, a visual alert, information regarding a vehicle of the at least one vehicle, information regarding the second EMV, information regarding a lane in which the vehicle is traveling, information regarding a lane in which the second EMV is traveling, a directional indicator of a location of the vehicle with respect to the first EMV, a directional indicator of a location of the second EMV with respect to the first EMV, and/or a message indicating that the first EMV may safely proceed through the intersection.

12. The first device of claim 10, wherein the one or more processors are further configured to:
receive, from a public safety dispatch system, a first responder type for the first EMV, a second responder type for the second EMV, and an incident type for an incident to which the first EMV and the second EMV are responding; and
at least one of:
provide, to a traffic control system and based on the first responder type, the second responder type, and the incident type, instructions to change traffic control signals at the intersection to provide the first EMV and/or the second EMV with right-of-way;
provide, to the second device and based on the first responder type, the second responder type, and the incident type, instructions to yield to the second EMV; or
provide, to a first navigation system associated with the first EMV and/or a second navigation system associated with the second EMV and based on the first responder type, the second responder type, and the incident type, instructions to provide a route preventing a collision between the first EMV and the second EMV.

13. The first device of claim 10, wherein the one or more processors are further configured to:
provide, to a first navigation system associated with the first EMV, instructions to direct the first EMV to a first side of a building; and
provide, to a second navigation system associated with the second EMV, instructions to direct the second EMV to a second side of the building.

14. The first device of claim 10, wherein the one or more processors are further configured to:
receive, from a public safety dispatch system, an incident type for an incident to which the first EMV and the second EMV are responding;
receive, from the second device, information regarding a first drug inventory in the first EMV;
receive, from the third device, information regarding a second drug inventory in the second EMV; and
at least one of:
provide, to a traffic control system and based on the first drug inventory, the second drug inventory, and the incident type, instructions to change traffic control signals at the intersection to provide the first EMV and/or the second EMV with right-of-way; or
provide, to the second device and based on the first drug inventory, the second drug inventory, and the incident type, instructions to yield to the second EMV.

15. A non-transitory computer-readable medium storing instructions, the instructions comprising:
one or more instructions that, when executed by one or more processors of a first device, cause the one or more processors to:
receive, from a second device associated with an emergency motor vehicle (EMV), EMV-tracking information and a communication that the EMV is in emergency response mode, wherein the EMV-tracking information indicates a location of the EMV, a direction of travel of the EMV, and/or a speed of the EMV;
determine, based on the EMV-tracking information, that the EMV is approaching an intersection;
receive, from a third device, user-tracking information, wherein the user-tracking information indicates a location of a user vehicle, a direction of travel of the user vehicle, and/or a speed of the user vehicle;
determine, based on the user-tracking information, that the user vehicle is approaching the intersection;
determine, based on the EMV-tracking information and the user-tracking information, whether the EMV is predicted to collide with the user vehicle; and provide, to the second device and based on the determination of whether the EMV is predicted to collide with the user vehicle, a notification including information regarding safety of the EMV to proceed through the intersection.

16. The non-transitory computer-readable medium of claim 15, wherein the one or more instructions, when executed by the one or more processors, further cause the one or more processors to:

provide, to a fourth device, instructions to generate a visual alert for the EMV regarding safety of the EMV to proceed through the intersection, wherein the fourth device includes a traffic control signal, a crosswalk signal, a traffic sign, a construction sign, and/or street lighting.

17. The non-transitory computer-readable medium of claim 15, wherein the one or more instructions, when executed by the one or more processors, further cause the one or more processors to:

provide, to a traffic control system, instructions to change traffic control signals at the intersection to provide the EMV with right-of-way.

18. The non-transitory computer-readable medium of claim 15, wherein the user vehicle is a first user vehicle, and wherein the one or more instructions, when executed by the one or more processors, further cause the one or more processors to:

provide, to a navigation system associated with a second user vehicle, instructions to direct the second user vehicle away from a route of the EMV.

19. The non-transitory computer-readable medium of claim 15, wherein the one or more instructions, when executed by the one or more processors, further cause the one or more processors to:

determine, based on the EMV-tracking information and the user-tracking information, that the user vehicle failed to yield to the EMV; and provide, to a law enforcement agency, information regarding the user vehicle and the determination that the user vehicle failed to yield to the EMV.

20. The non-transitory computer-readable medium of claim 15, wherein the one or more instructions, when executed by the one or more processors, further cause the one or more processors to:

receive, from a fourth device associated with an obstructive vehicle, obstructive-vehicle-tracking information, wherein the obstructive vehicle is a type of vehicle that obstructs traffic flow; and provide, to a navigation system associated with the EMV, instructions, based on the obstructive-vehicle-tracking information, to direct the EMV on a route that avoids the obstructive vehicle.

* * * * *